(12) United States Patent
Geal, III et al.

(10) Patent No.: US 11,926,568 B1
(45) Date of Patent: Mar. 12, 2024

(54) FAST-SETTING FLOWABLE FILL COMPOSITIONS, AND METHODS OF UTILIZING AND PRODUCING THE SAME

(71) Applicant: J&P Invesco LLC, Schertz, TX (US)

(72) Inventors: George Clarence Geal, III, Parker, CO (US); Stanley R. Peters, Castle Rock, CO (US)

(73) Assignee: J&P Invesco LLC, Schertz, TX (US)

( * ) Notice: Subject to any disclaimer, the term of this patent is extended or adjusted under 35 U.S.C. 154(b) by 0 days.

(21) Appl. No.: 17/569,662

(22) Filed: Jan. 6, 2022

Related U.S. Application Data

(63) Continuation of application No. 17/076,238, filed on Oct. 21, 2020, now Pat. No. 11,247,942, which is a continuation of application No. 16/394,670, filed on Apr. 25, 2019, now Pat. No. 10,843,968, which is a continuation of application No. 15/422,659, filed on Feb. 2, 2017, now Pat. No. 10,322,971.

(60) Provisional application No. 62/493,801, filed on Jul. 18, 2016, provisional application No. 62/325,734, filed on Apr. 21, 2016.

(51) Int. Cl.
| | |
|---|---|
| *C04B 28/04* | (2006.01) |
| *C04B 14/06* | (2006.01) |
| *C04B 22/10* | (2006.01) |
| *C04B 111/00* | (2006.01) |
| *E02D 17/12* | (2006.01) |

(52) U.S. Cl.
CPC .............. *C04B 28/04* (2013.01); *C04B 14/06* (2013.01); *C04B 22/106* (2013.01); *E02D 17/12* (2013.01); *C04B 2111/00724* (2013.01); *C04B 2111/0075* (2013.01); *E02D 2300/0018* (2013.01); *E02D 2300/002* (2013.01)

(58) Field of Classification Search
CPC ....... C04B 28/04; C04B 14/06; C04B 22/106; C04B 2111/00724; C04B 2111/0075; E02D 17/12; E02D 2300/0018; E02D 2300/002
See application file for complete search history.

(56) References Cited

U.S. PATENT DOCUMENTS

| | | | |
|---|---|---|---|
| 1,782,471 | A | 11/1930 | Kirchener |
| 1,968,152 | A | 7/1934 | Kirchener |
| 2,307,485 | A | 1/1943 | Booth |
| 2,434,301 | A | 1/1948 | Wertz |
| 2,600,018 | A | 6/1952 | Nelson et al. |
| 2,806,531 | A | 9/1957 | Morgan et al. |
| 2,819,171 | A | 1/1958 | Benedict et al. |
| 2,820,713 | A | 1/1958 | Wagner |
| 2,890,965 | A | 6/1959 | Underdown et al. |
| 3,008,843 | A | 11/1961 | Jolly |
| 3,427,175 | A | 2/1969 | Angstadt et al. |
| 4,032,353 | A | 6/1977 | Ball |
| 4,042,408 | A | 8/1977 | Murray et al. |
| 4,209,336 | A | 6/1980 | Previte |
| 4,264,367 | A | 4/1981 | Schutz |
| 4,444,593 | A | 4/1984 | Schutz |
| 5,106,422 | A | 4/1992 | Bennett et al. |
| 5,211,751 | A | 5/1993 | Arfaei et al. |
| 5,378,278 | A | 1/1995 | Colburn |
| 5,728,209 | A | 3/1998 | Bury |
| 5,785,751 | A | 7/1998 | Bashlykov et al. |
| 6,485,561 | B1 | 11/2002 | Dattel |
| 6,648,962 | B2 | 11/2003 | Berke et al. |
| 6,869,474 | B2 | 3/2005 | Perez-Pena et al. |
| 6,890,382 | B2 | 5/2005 | Zampieri |
| 6,913,645 | B2 | 7/2005 | McNulty, Jr. |
| 7,029,527 | B2 | 4/2006 | Gaudry et al. |
| 7,427,321 | B2 | 9/2008 | Hilton et al. |
| 7,670,427 | B2 | 3/2010 | Perez-Pena et al. |
| 7,842,348 | B2 | 11/2010 | Abbott et al. |
| 8,167,998 | B2 | 5/2012 | Ladely et al. |
| 8,747,547 | B1 | 6/2014 | Peters et al. |
| 8,822,567 | B2 | 9/2014 | Kono et al. |
| 9,028,606 | B2 | 5/2015 | Andersen |
| 9,038,719 | B2 | 5/2015 | Crews |

(Continued)

FOREIGN PATENT DOCUMENTS

| | | |
|---|---|---|
| BE | 508098 A1 | 1/1952 |
| BE | 582948 A1 | 1/1960 |

(Continued)

OTHER PUBLICATIONS

ARG Roving Specification, Nippon Electric Glass Co., Ltd, Kanzaki, Shiga, Japan, Feb. 5, 2001, version 2, 1 page.
BCSA is a stand-alone rapid-setting Cement, PP composition, 2018, Eupave, 1 page.
Bost et al., "Comparison of the accelerating effect of various additions on the early hydration of Portland cement," Construction and Building Materials, Jun. 15, 2016, 2 pages.

(Continued)

*Primary Examiner* — Anthony J Green
(74) *Attorney, Agent, or Firm* — Merchant & Gould P.C.

(57) ABSTRACT

Fast-setting flowable fill compositions for filling ground trenches are described. The compositions set quickly but retain a low strength psi at 28 days. The compositions also reduce bleed water on the surface of the fast-setting flowable fill and therefor enable quicker application of surface repair material, e.g., pavement patches, to the trench. The compositions consist of aggregate, Portland cement, accelerant, water and sometimes air. The compositions may have a compressive strength of between 5 psi and 60 psi after 2 hours, a compressive strength of between 10 psi and 100 psi after 4 hours, a compressive strength of between 75 psi and 500 psi after 28 days, a penetration resistance of between 1.5 tsf and 75 tsf after 2 hours, a penetration resistance of between 4.5 tsf and 200 tsf after 4 hours, and a shrinkage of less than 2% as measured by ASTM C490. Also disclosed are methods of filling a trench with fast-setting flowable fill.

9 Claims, 4 Drawing Sheets

(56) References Cited

U.S. PATENT DOCUMENTS

| | | |
|---|---|---|
| 9,090,508 B2 | 7/2015 | Gong |
| 10,239,790 B2 | 3/2019 | Byrd |
| 10,322,971 B1 | 6/2019 | Geal, III |
| 10,571,045 B2 | 2/2020 | Pino, Jr. et al. |
| 10,571,047 B2 | 2/2020 | Pino, Jr. et al. |
| 10,641,414 B2 | 5/2020 | Pino, Jr. et al. |
| 10,843,968 B1 | 11/2020 | Geal |
| 10,851,016 B1 | 12/2020 | Peters |
| 10,919,807 B1 | 2/2021 | Karam |
| 11,247,942 B1 | 2/2022 | Geal |
| 11,434,169 B1 | 9/2022 | Peters |
| 11,440,841 B1 | 9/2022 | Peters |
| 2002/0117088 A1 | 8/2002 | Norman et al. |
| 2003/0041785 A1 | 3/2003 | Harrison |
| 2005/0103234 A1 | 5/2005 | McNulty |
| 2008/0227891 A1 | 9/2008 | Jarvie et al. |
| 2009/0114126 A1 | 5/2009 | Roddy et al. |
| 2009/0158960 A1 | 6/2009 | Andersen |
| 2009/0158965 A1 | 6/2009 | Andersen |
| 2009/0158967 A1 | 6/2009 | Andersen |
| 2010/0064943 A1 | 3/2010 | Guevara et al. |
| 2010/0095871 A1 | 4/2010 | Patil et al. |
| 2011/0021668 A1 | 1/2011 | Hamai et al. |
| 2012/0037046 A1 | 2/2012 | La Rolland et al. |
| 2012/0040165 A1 | 2/2012 | Dubey |
| 2012/0196046 A1 | 8/2012 | Nicoleau |
| 2013/0008354 A1 | 1/2013 | Constantz |
| 2013/0087075 A1 | 4/2013 | Massa |
| 2014/0083698 A1 | 3/2014 | Stone et al. |
| 2014/0138007 A1 | 5/2014 | Dubey et al. |
| 2014/0311387 A1 | 10/2014 | Hohn et al. |
| 2015/0175887 A1 | 6/2015 | Welker |
| 2015/0240163 A1 | 8/2015 | Welker |
| 2015/0291476 A1 | 10/2015 | Al-Mutlaq |
| 2018/0106015 A1 | 4/2018 | Pino et al. |
| 2018/0156357 A1 | 6/2018 | Pino et al. |
| 2020/0149659 A1 | 5/2020 | Pino, Jr. et al. |
| 2020/0149660 A1 | 5/2020 | Pino, Jr. et al. |
| 2020/0200292 A1 | 6/2020 | Pino, Jr. et al. |

FOREIGN PATENT DOCUMENTS

| | | |
|---|---|---|
| CA | 412214 A | 5/1943 |
| CA | 419133 A | 3/1944 |
| CA | 419134 A | 3/1944 |
| CA | 419135 A | 3/1944 |
| CA | 462493 A | 1/1950 |
| CA | 520832 A | 1/1956 |
| CA | 566361 A | 11/1958 |
| CA | 607361 A | 10/1960 |
| CA | 607391 A | 10/1960 |
| CA | 625024 A | 8/1961 |
| CA | 713618 A | 7/1965 |
| CA | 900635 A | 5/1972 |
| CA | 1204456 | 5/1986 |
| CN | 101670619 A | 3/2010 |
| DE | 1807608 A1 | 6/1970 |
| EP | 114448 A1 | 8/1984 |
| EP | 127960 A1 | 12/1984 |
| EP | 402306 A1 | 12/1990 |
| EP | 2520553 A1 | 11/2012 |
| EP | 1532080 B2 | 3/2014 |
| EP | 2832706 A1 | 2/2015 |
| EP | 2414301 B2 | 11/2015 |
| FR | 38549 E | 6/1931 |
| FR | 1591415 A | 4/1970 |
| FR | 2061507 A2 | 6/1971 |
| GB | 301509 A | 1/1930 |
| GB | 430781 A | 6/1935 |
| GB | 791622 A | 3/1958 |
| GB | 833071 A | 4/1960 |
| GB | 1181331 A | 2/1970 |
| GB | 1315225 A | 5/1973 |
| IN | 154852 A1 | 12/1984 |
| IN | 159750 A1 | 6/1987 |
| JP | 06040756 A | 2/1994 |
| JP | 06298552 A | 10/1994 |
| JP | 08029963 B2 | 3/1996 |
| JP | 2802972 B2 | 9/1998 |
| JP | 11217253 A | 8/1999 |
| JP | 2000007402 A | 1/2000 |
| JP | 2000095554 A | 4/2000 |
| JP | 3125316 B2 | 1/2001 |
| JP | 2004002080 A | 1/2004 |
| JP | 3558730 B2 | 8/2004 |
| JP | 2005324982 A | 11/2005 |
| JP | 2006298661 A | 11/2006 |
| JP | 4157485 B2 | 10/2008 |
| JP | 4290628 B2 | 7/2009 |
| JP | 4348001 B2 | 10/2009 |
| JP | 2010150105 A | 7/2010 |
| JP | 4626541 B2 | 2/2011 |
| JP | 4705455 B2 | 6/2011 |
| JP | 4725742 B2 | 7/2011 |
| JP | 4813822 B2 | 11/2011 |
| JP | 4837161 B2 | 12/2011 |
| JP | 4860396 B2 | 1/2012 |
| JP | 4877886 B2 | 2/2012 |
| JP | 5051990 B2 | 10/2012 |
| JP | 5113496 B2 | 1/2013 |
| JP | 2013170436 | 9/2013 |
| JP | 2013077378 A1 | 4/2015 |
| JP | 2015124141 A | 7/2015 |
| JP | 2015229684 A | 12/2015 |
| KR | 100311286 B2 | 9/2001 |
| KR | 1020120016432 A | 2/2012 |
| LU | 57288 A1 | 2/1969 |
| RU | 2099302 C1 | 12/1997 |
| RU | 2102356 C1 | 1/1998 |
| RU | 2119900 C1 | 10/1998 |
| RU | 2186942 C1 | 8/2002 |
| RU | 2257294 C1 | 7/2005 |
| RU | 2337124 C1 | 10/2008 |
| RU | 2434923 C1 | 11/2011 |
| RU | 2470979 C1 | 12/2012 |
| RU | 2497861 C1 | 11/2013 |
| RU | 2525408 C1 | 8/2014 |
| RU | 2542063 C1 | 2/2015 |
| RU | 2545208 C1 | 3/2015 |
| RU | 2553807 C1 | 6/2015 |
| RU | 2555683 C1 | 7/2015 |
| SU | 848594 A1 | 7/1981 |
| SU | 876960 A1 | 10/1981 |
| SU | 1411439 A1 | 7/1988 |
| SU | 1435762 A1 | 11/1988 |
| SU | 1585309 A1 | 8/1990 |
| SU | 1682531 A1 | 10/1991 |
| WO | 8601795 A1 | 3/1986 |
| WO | 0051947 A1 | 9/2000 |
| WO | 2008130107 A1 | 10/2008 |
| WO | 2010047919 A1 | 4/2010 |
| WO | 2011139466 A1 | 11/2011 |
| WO | 2012136963 A1 | 10/2012 |
| WO | 2014068409 A2 | 5/2014 |
| WO | 2014072533 A1 | 5/2014 |
| WO | 2015034531 A1 | 3/2015 |
| WO | 2015034543 A1 | 3/2015 |
| WO | 2015130284 A1 | 9/2015 |
| WO | 2016043500 A1 | 3/2016 |

OTHER PUBLICATIONS

Chryso Turbocast NCT, concrete admixture, Safety Data Sheet, according to Federal Register, vol. 77, No. 58, Monday, Mar. 26, 2012, pp. 1-5.

Chryso, Material Safety Data Sheet, Chryso Plast P150, Revision Date Jun. 26, 2009, 5 pages.

Fibercast, by Propex, Product Data, Fibercast 500, PCS-1156E-002 (Mar. 2017), 2 pages.

Juenger et al., "A soft X-ray microscope investigation into the effects of calcium chloride on tricalcium silicate hydration," Cement and Concrete Research, Jan. 1, 2005, 2 pages.

(56) References Cited

OTHER PUBLICATIONS

Kosmatka et al., "Design and Control of Concrete Mixtures," The guide to applications, methods, and materials, 15th edition, Engineering Bulletin 001, Portal Cement Association, 2011, p. 91.

Liquid Calcium chloride, Product Data Sheet, Tetra Chemicals, 2004, 1 page.

Odler et al., "On the combined effect of water solubles lignosulfonates and carbonates on portland cement and clinker pastes 1. Physical properties," Cement and Concreate Research, Jul. 1, 1978, 2 pages.

Rapid Set Cement, Fast Setting Hydraulic Cement, Manufacturer: CTS Cement Manufacturing Corp., 1982, 1 page.

Rapp, "Effect of Calcium Chloride on Portland Cements and Concretes," Journal of Research of the National Bureau of Standars, Apr. 1, 1935, 2 pages.

Reddy, V. Venkateswarna et al., "Influence of strong alkaline substances (sodium carbonate and sodium bicarbonate) in mixing water on strength and setting properties of concrete", Indian Journal of Engineering & Materials Sciences, vol. 13, Apr. 2006, pp. 123-128.

Rosenberg, "Study of the Mechanism Through Which Calcium Chloride Accelerates the Set of Portland," Oct. 1, 1964, 2 pages.

Safety Data Sheet, Rapid Set, CTS cement, Version No. 2, revision date Issue date Jan. 27, 2018, pp. 1-7.

Surecrete Design Products, Inc., Safety Data Sheet, TruTique—Integral Color (Gun Metal), revision date Jan. 1, 2017, 7 pages.

Western Material & Design, LC, FasTrac 400, vol. Mar. 2018, 2 pages.

Williams et al., "Developing Mixture Proportion Guidance for Field-Prepared Rapid-Setting Materials for Emergency Airfield Repairs," Feb. 8, 2012, 2 pages.

Witlbank et al., "Effect of Selected Accelerants on the Physical Properties of Mineral Trioxide Aggregate and Portland Cement," Journal of Endodontics, Oct. 1, 2007, 2 pages.

FAST-SETTING FLOWABLE FILL COMPOSITIONS, AND METHODS OF UTILIZING AND PRODUCING THE SAME

RELATED APPLICATIONS

This application is a continuation of U.S. patent application Ser. No. 17/076,238, filed Oct. 21, 2020, now U.S. Pat. No. 11,247,942, entitled, "Fast-Setting Flowable Fill Compositions, and Methods of Utilizing and Producing the Same," which is a continuation of U.S. patent application Ser. No. 16/394,670, filed Apr. 25, 2019, now U.S. Pat. No. 10,843,968, entitled "Fast-Setting Flowable Fill Compositions, and Methods of Utilizing and Producing the Same," which is a continuation of U.S. patent application Ser. No. 15/422,659, filed Feb. 2, 2017, now U.S. Pat. No. 10,322,971, entitled "Fast-Setting Flowable Fill Compositions, and Methods of Utilizing and Producing the Same," which claims priority to U.S. Provisional Patent Application Ser. No. 62/325,734, filed Apr. 21, 2016, and U.S. Provisional Patent Application Ser. No. 62/493,801, filed on Jul. 18, 2016, which are fully incorporated herein by reference.

INTRODUCTION

Demands of construction and opening roadways to traffic have accelerated in the last several years. Contractors are pressured to backfill a construction trench and cover the backfill with an asphalt patch in much less time than was traditionally required. Traditional Portland cement-sand Controlled Low Strength Materials (CLSM) can take 8 to 12, even up to 24 hours before suitable for pavement repairs, and these traditional CLSMs have significant bleed water on the surface, which is problematic for applying an asphalt patch on top of the CLSM.

The problem with accelerating the set time of backfill CLSM compositions (e.g., using accelerators to decrease the set time of cement) in order to meet the reduced-time demands of modern construction is that the use of accelerants to decrease set time leads to compositions that result in an increased compressive strength of the final set composition. Increased compressive strengths are unfavorable for future excavation. Traditional Portland-cement based CLSMs as defined by the American Concrete Institute (ACI) 229 defines CLSMs as materials having compressive strength of 1200 psi or less, and suggests 300 pounds per square inch (psi) as the upper limit of compressive strength to permit easier excavation at a later date. The upper limit of 1200 psi allows for the use of this material in applications where future excavation is unlikely, such as structural fill under buildings. Entities that are responsible for maintaining the utilities in the backfilled trenches often times prefer 100-200 psi for ease of later excavation.

The present disclosure generally relates to accelerating the set-times of Portland cement and/or aggregate mixtures, by using an accelerant, e.g., sodium bicarbonate, to produce a fast-setting flowable fill for rapid utility trench filling in streets and roadways. The disclosed compositions reduce bleed water on the surface of the trench fill, which permits quicker application of a fast setting pavement repair material to the surface of the presently disclosed compositions. Typical fast setting surface materials, such as asphalt, either generate heat during curing, or are applied hot (350-400 F), and all are adversely affected by any surface water. The disclosed compositions also exhibit a reduced final compressive strength of the composition after setting and thereby allow for easy excavation at a later date. In applications where a fast-setting, higher strength flowable fill material is desired, however, a combination of accelerants is useful.

SUMMARY

The present disclosure identifies a composition for decreasing set times comprising between 60% and 90% aggregate by weight of the composition, between 3% and 25% Portland cement by weight of the composition, between 0.25% and 8% accelerant by weight of the composition, and between 8% and 35% water by weight of the composition. The composition may have a compressive strength of between 5 psi and 60 psi after 2 hours, a compressive strength of between 10 psi and 100 psi after 4 hours, and a compressive strength of between 75 psi and 500 psi after 28 days. The composition may have a penetration resistance of between 1.5 tons per square foot (tsf) and 75 tsf after 2 hours and a penetration resistance of between 4.5 tsf and 200 tsf after 4 hours. The composition may have shrinkage of less than 2% as measured by ASTM C940.

The aggregate in some disclosed compositions may be fine aggregate, coarse aggregate, micro aggregate (e.g., Bag House Fines) sand, recycled trench spoils, screened native soils, recycled materials or some combination thereof. The accelerant in some disclosed compositions may be sodium carbonate, sodium bicarbonate, calcium chloride, non-chloride accelerator (NCA), or some combination thereof. In certain disclosed compositions a water reducer, e.g., Chryso® P150 or other water reducer standard in the industry, between 9 and 18 fluid ounces per cubic yard of the composition is included. In certain disclosed compositions a polymer, e.g., hydroxypropyl methylcellulose, between 0.05% and 0.12% by weight of dry solids is included in the composition.

The present disclosure identifies a fast-setting composition for decreasing residual surface water comprising between 65% and 85% aggregate by weight of the composition, between 4% and 20% Portland cement by weight of the composition, between 0.5% and 4% sodium bicarbonate by weight of the composition, and between 10% and 30% water by weight of the composition.

The present disclosure also identifies a method of backfilling a trench to reduce residual surface water comprising excavating the trench, mixing a composition of the present disclosure using aggregate excavated from the trench (recycled spoils), and filling the trench with a composition of the present disclosure that includes aggregate excavated from the trench (recycled spoils).

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional applications to which this application claims priority are incorporated herein in their entirety.

BRIEF DESCRIPTION OF DRAWINGS

FIG. 1 is a graph of the compressive strength (Y-axis (psi)) of G400-AABL (solid line) and G400-AA (dotted line) against the age in hours (X-axis (first 12 hours)) post mixing.

FIG. 2 is a graph of the compressive strength (Y-axis (psi)) of G400-AABL (solid line) and G400-AA (dotted line) against the age in days (X-axis (first 28 days)) post mixing.

FIG. 3 is a graph of the compressive strength (Y-axis (psi)) of G400-AA (hyphened line), BHF-300 (dotted line), and BHF-500 (solid line) against the age in hours (X-axis (first 12 hours)) post mixing.

FIG. 4 is a graph of the compressive strength (Y-axis (psi)) of G400-AA (hyphened line), BHF-300 (dotted line), and BHF-500 (solid line) against the age in days (X-axis (first 28 days)) post mixing FIG. 5 is a graph of the compressive strength (Y-axis (psi)) of G400-AABL, G400-AA, BHF-300, BHF-500, and S200-TS against the age in hours (X-axis (first 12 hours)) post mixing.

FIG. 6 is a graph of the compressive strength (Y-axis (psi)) of G400-AABL, G400-AA, BHF-300, BHF-500, and S200-TS against the age in days (X-axis (first 28 days)) post mixing.

FIG. 7 is a graph of particle size distributions of various ingredients from embodiments of the present disclosure, including concrete sand, BHF, and cement.

FIG. 8 is a graph that illustrates the particle size distribution of concrete sand, recycled trench spoils, and a BHF-cement blend used in the embodiments of the present disclosure as a function of particle sixe (X-axis (mm)) versus percent passing (Y-axis (%)).

DETAILED DESCRIPTION

Figure 1:
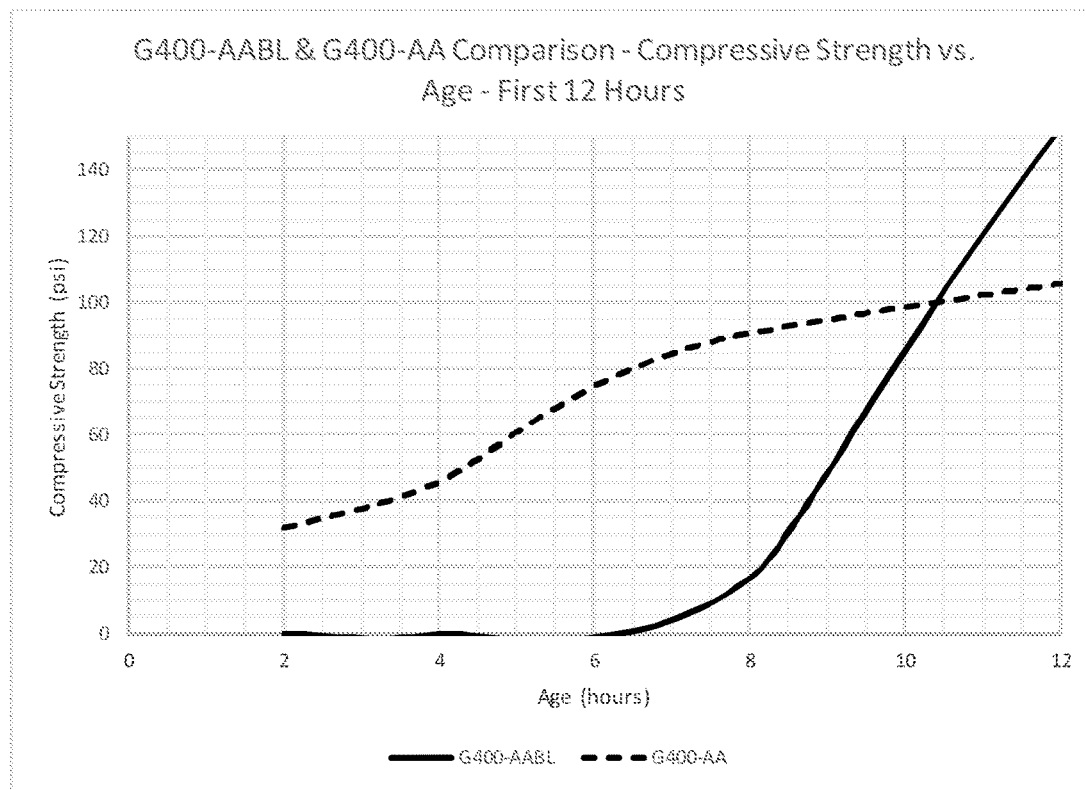
FIG. 1.

The present disclosure provides compositions and methods for decreasing the set time of CLSM used for filling trenches while maintaining a low final compressive strength (e.g., less than 300 psi at 28 days). The present disclosure provides compositions and methods that also reduce residual surface (bleed) water on the surface of CLSM used for filling trenches.

Generally, one must consider several factors when determining an appropriate composition for backfilling a trench or void in the middle of a public roadway or street. These factors include the flowability or spread of the flowable fill, the setting time of the flowable fill, the final compressive strength of the flowable fill, the removability of the flowable fill, and the surface (bleed) water present on top of the composition following placement.

For example, strength development in backfilling compositions is directly related to the amount of cementitious material, aggregate, and water content. In an embodiment of this disclosure, the primary cementitious material is Portland cement. In an embodiment of this disclosure, the aggregate may be fine aggregate, coarse aggregate, micro aggregate. sand, recycled spoils, or some combination thereof. Water content of the composition also influences strength development as the addition of water controls flowability or slump. While it is desirable to support the intended use, e.g., traffic loading, the final strength of the composition must still allow later excavation. In certain embodiments, a composition should be less than 300 psi at 28 days for ease of later excavation.

In addition, considering the flowability of the compositions will assume the advantage of the self-compacting and self-leveling qualities of composition. In some embodiments of the present disclosure, the flowability may be determined using ASTM D6103, e.g., utilizing a moistened 3 inch diameter by 6 inch high open-ended cylinder filled with a composition. Along with strength development and flowability, setting time is an additional factor to consider when determining a suitable composition. The faster the composition sets and gains strength after filling the void, the sooner the backfilled surface may be paved or patched and returned to normal use.

In addition, considering the surface (bleed) water present on the surface of the present compositions following placement in a trench is important. Reducing or eliminating the surface (bleed) water allows quicker placement of a pavement patch or similar to the flowable fill, which in turn allows quicker reopening of a public roadway or surface for its intended use.

The present disclosure reveals a fast-setting flowable fill composition, generating higher early strengths yet still sufficiently low ultimate strengths, while at the same time reducing surface (bleed) water. In an embodiment, the present disclosure achieves these goals using an accelerant in combination with Portland cement and aggregate.

An embodiment of the CLSM technology includes a composition for decreasing residual surface water comprising or consisting essentially of between 60% and 90% aggregate by weight of the composition, between 3% and 25% Portland cement by weight of the composition, between 0.25% and 8% accelerant by weight of the composition, and between 8% and 35% water by weight of the composition. In an embodiment, the composition has a compressive strength of between 5 psi and 60 psi after 2 hours, a compressive strength of between 10 psi and 100 psi after 4 hours, a compressive strength of between 75 psi and 500 psi after 28 days, a penetration resistance of between 1.5 tsf and 75 tsf after 2 hours, and a penetration resistance of between 4.5 tsf and 200 tsf after 4 hours. In certain embodiments, the composition has a shrinkage of less than 2% as measured by ASTM C940.

Another embodiment of the CLSM technology includes a composition for decreasing residual surface water comprising or consisting essentially of between 65% and 85% aggregate by weight of the composition, between 4% and 20% Portland cement by weight of the composition, between 0.5% and 4% accelerant by weight of the composition, and between 10% and 30% water by weight of the composition.

In an embodiment of the present disclosure, the aggregate is standard concrete grade sand, for example, sand from Austin Aggregates, 881 Hergotz Ln, Austin, TX 78742, or Vulcan Materials Company, 1200 Urban Center Drive, Birmingham, AL 35242, or Webberville Sand & Gravel, 18601 FM 969, Manor, Texas 78653. The aggregate may, however, be a combination of one or more of the following: sand, fine aggregate (concrete sand), coarse aggregate (rock or gravel), recycled trench spoils, or micro aggregate (e.g., rock dust, which is commonly known as Bag House Fines (BHF).)

Fine aggregate is known in the industry as concrete sand and is defined by ASTM C33 specifications. Coarse aggregate is known in the industry as rock or gravel and is also defined by ASTM C33 specifications. Recycled trench spoils refers to the material excavated to create a trench, e.g., the gravel and sand excavated from the ground to create a trench in order to place cables or wires into the trench prior to backfilling the trench with compositions of the present disclosure. Micro aggregate refers ultra-fine, inert or chemically active, particles that are predominantly sized less than a #200 sieve. One example of a micro aggregate is BHF, which are dust-sized micro aggregates that are typically, but not necessarily, captured in bag houses to prevent air pollution, and could be inert minerals, lime, cement kiln dust, or other chemical or mineral materials. Thus, BHF includes micro aggregates recovered via one or more of fabric filters (baghouses), wet scrubbers, electrostatic precipitators (wet or dry), and mechanical collectors (e.g., cyclones).

Rock dust is known in the industry as an example of BHF and is a byproduct "harvested" from a hot-mix asphalt plant when drying the moist raw aggregate materials and raising the temperature up to approximately 350-400 F, which is required to properly mix the liquid asphalt cement to make the final hot-mix asphaltic concrete for road paving. There is an economic benefit to harvesting the BHF from the production of hot-mix asphalt since higher quantities of expensive liquid asphalt cement is needed to coat the BHF if left in or returned to the aggregate mixture, when the extra rock dust is not really needed for the final mix. Past efforts to "waste" them have been unsuccessful, since the disposal of the hot, fine-powdery material creates an air pollution problem, which is why these fines are collected by the bag house in the first place, and then re-introduced to the hot aggregate blend during mixing with asphalt cement. The present disclosure creates a new beneficial use for "harvested" BHFs (whether from an asphalt plant or otherwise). For asphalt plants in particular, though, the CLSM embodiments described herein represent a new beneficial use of the waste product allowing lower material costs of traditional asphalt cement production, while simultaneously creating a new raw aggregate source for the production of CLSMs.

The unexpected benefit of developing a new market or beneficial use of BHFs, is that with hot-mix asphalt plants located in every city across America, there is an extensive supply of this inert, super-fine aggregate that should be economically available, since harvesting it is economically beneficial to normal hot-mix asphalt production. Alternately, other industrial processes may be a source of similar micro aggregates (BHFs), such as cement kiln dust (CKD), or other chemicals or minerals, having similar sizes.

In an embodiment of the present disclosure, the composition has between about 50% and about 95% aggregate, between about 55% and about 90% aggregate, between about 60% and about 90% aggregate, between about 65% and about 85% aggregate, or between about 70% and 80% aggregate. In certain embodiments, a composition of the present disclosure will have less than about 95% aggregate, less than about 90% aggregate, less than about 85% aggregate, less than about 80% aggregate, less than about 75% aggregate, less than about 70% aggregate, less than about 65% aggregate, or less than about 60% aggregate. In still other embodiments, a composition of the present disclosure will have greater than about 55% aggregate, greater than about 60% aggregate, greater than about 65% aggregate, greater than about 70% aggregate, greater than about 75% aggregate, greater than about 80% aggregate, or greater than about 85% aggregate.

In certain embodiments of the present disclosure, the aggregate will consist entirely of sand, fine aggregate, coarse aggregate, recycled trench spoils, or micro aggregates like BHFs. In other embodiments of the present disclosure, the aggregate may consist of one or more combinations of sand, fine aggregate, coarse aggregate, recycled trench spoils, or BHF in order to reach the desired specification for the composition, e.g., as shown in Example 1. In still other embodiments, BHF may be added as a secondary aggregate. For example, a composition may include between 5% and 80% BHF by weight of the composition, between 15% and 30% BHF by weight of the composition.

In an embodiment of the present disclosure, the cementitious material is standard Portland cement, which is well known in the industry. The Portland cement of the present disclosure may be Type I, Type II, Type III, Type IV, Type V, or some combination thereof. In an embodiment, the Portland cement is Type I-II. The Portland cement of the present disclosure can be obtained from a variety of sources based on economics, location, chemical properties, or additional criteria. For example, Portland cement can be obtained from CEMEX 5134 Ute Rd, Longmont, Colorado 80503.

In an embodiment of the present disclosure, a composition has between about 3% and about 25% Portland cement, between about 4% and about 20% Portland cement, between about 8% and about 17% Portland cement, or between about 12% and about 17% Portland cement.

In some embodiments of the present disclosure, a composition has a measurable amount of, but less than about 40% Portland cement, less than about 35% Portland cement, less than about 30% Portland cement, less than about 25% Portland cement, less than about 20% Portland cement, less than about 15% Portland cement, or less than about 10% Portland cement.

In additional embodiments of the present disclosure, the composition has greater than about 3% Portland cement, greater than about 4% Portland cement, greater than about 6% Portland cement, greater than about 10% Portland cement, greater than about 15% Portland cement, greater than about 20% Portland cement, greater than about 25% Portland cement, greater than about 30% Portland cement, or a greater than about 35% Portland cement.

In an embodiment of the presently disclosed composition, the accelerant is sodium carbonate (soda ash), sodium bicarbonate (baking soda), calcium chloride ($CaCl_2$), NCA, or some combination thereof. In certain embodiments, the accelerant is dry powder or liquid, or some combination thereof. The accelerant may be purchased from well-known commercial sources, e.g., Skyonic Corporation, 900 S. Capital of Texas Hwy., Suite 475 Austin, Texas 78746 or Carbonfree Chemicals SPE I, LLC, 11503 Bulverde Road, San Antonio, Texas 78217. Carbonfree Chemicals uses a process referred to as Skymine® that scrubs the $CO_2$ from a flue gas stream and precipitates sodium bicarbonate out as a product. The sodium bicarbonate used in some embodiments of the present disclosure is from the first Skymine® system installed in the United States at the Capitol Aggregates Cement plant in San Antonio, Texas. Sodium bicarbonate can also be purchased from Solvay in Green River, WY after being mined as trona and refined into SBC.

The accelerant of the presently disclosed composition may vary depending on setting time and final compressive strength. In an embodiment of the present disclosure, a composition has between about 0.25% and about 8.0% accelerant by weight of the composition, between about 0.50% and about 6%, between about 0.5% and about 4.0%, between about 0.5% and about 2%, between about 1.0% and about 4.0%, between about 1.0% and about 3.0%.

In additional embodiments, a composition has greater than about 0.1% accelerant by weight of the composition, greater than about 0.2% accelerant, greater than about accelerant, greater than about 1.0% accelerant, greater than about 2.0% accelerant, or greater than about 3.0% accelerant. In other embodiments, a composition has less than about 10% accelerant by weight of the composition, less than about 8.0% accelerant, less than about 6.0% accelerant, less than about 4.0% accelerant, less than about 2.0% accelerant, less than about 1.0% accelerant, or less than about 0.5% accelerant.

In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

The water content of the presently disclosed composition may vary depending on desired flowability, setting time, and final compressive strength. In an embodiment of the present disclosure, a composition has a the water content of between about 5% and about 40%, between about 8% and about 35%, between about 10% and about 30%, between about 15% and about 25%, between about 15% and about 35%, between about 20% and about 30%.

In additional embodiments, a composition has greater than about 5% water, greater than about 8% water, greater than about 10% water, greater than about 15% water, greater than about 20% water, or greater than about 25% water. In other embodiments, a composition has less than about 40% water, less than about 35% water, less than about 30% water, less than about 25% water, less than about 20% water, less than about 15% water, or less than about 10% water. Any water included with additional ingredients, e.g., aqueous water retarders, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

Compositions of the present disclosure will have a range of possible set times based on the desired application. For example, when backfilling trenches in a roadway a quick set time is desired providing the set time allows sufficient time to complete filling of the void with the composition. Despite the desire for a quick set time, the ultimate final compressive strength must not exceed the local agency standards, i.e., maintain good removability modulus numbers. In some embodiments, the set time of the composition is determined by measuring penetration resistance with a pocket penetrometer (e.g., with a resistance of 4 psi as typically used in standard ASTM WK 27337) or cement setting time standard ASTM C403. In an embodiment of the present disclosure, the set time for a composition can be between about 8 minutes and about 120 minutes, between about 9 minutes and about 90 minutes, between about 10 minutes and about 70 minutes, between about 11 minutes and about 60 minutes, between about 12 minutes and about 50 minutes, or between about 13 minutes and about 40 minutes. In additional embodiments, a composition has a set time of less than 120 minutes, of less than about 90 minutes, of less than about 60 minutes, of less than about 45 minutes, of less than about 40 minutes, of less than about 35 minutes, of less than about 30 minutes, of less than about 25 minutes, of less than about 15 minutes. In other embodiments, a composition has a set time of greater than about 5 minutes, of greater than about 10 minutes, of greater than about 15 minutes, of greater than about 20 minutes, of greater than about 25 minutes, or of greater than about 30 minutes.

Compositions of the present disclosure will have a range of compressive strengths at various times after the addition of a composition to a trench depending on the desired properties of the composition. For example, and similar to faster set times, a higher earlier compressive strength is advantageous when working when backfilling trenches in a roadway or other highly traveled area. The higher, earlier compressive strength allows for the backfilled void to be patched and reopened for use at an earlier time. Again, despite the desire for a high earlier compressive strength the final compressive strength must not exceed the local agency standards, i.e., maintain good removability modulus numbers.

In certain embodiments, the compressive strength is measured at 1 hour, 2 hours, 4 hours, 8 hours, 1 day, 7 days, and 28 days where the 28 day measurement is considered the final compressive strength. In other embodiments, the compressive strength is measured more often at smaller intervals. In some embodiments, the compressive strength is measured at 90 days. In an embodiment, the bearing capacity or penetration resistance of a composition is measured at 1 hour, 2 hours, 4 hours, 8 hours, 1, day, 7 days, and 28 days after backfilling using ASTM WK 27337 or C403.

In an embodiment, the compressive strength of a composition of the present disclosure as measured by ASTM D4832 at 2 hours will be between about 5 psi and about 60 psi, between about 10 psi and about 60 psi, between about 15 psi and about 40 psi. In additional embodiments, the compressive strength of the composition at 2 hours will be greater than about 5 psi, will be greater than about 10 psi, will be greater than about 15 psi, or will be greater than about 20 psi. In certain embodiments, the compressive strength of the composition at 2 hours will be less than about 75 psi, will be less than about 60 psi, will be less than about 50 psi, will be less than about 40 psi, will be less than about 35 psi, will be less than about 30 psi, will be less than about 25 psi, will be less than about 20 psi, or will be less than about 15 psi.

In an embodiment, the compressive strength of a composition of the present disclosure at 4 hours will be between about 20 psi and about 100 psi, between about 30 psi and about 80 psi, between about 40 psi and about 70 psi. In additional embodiments, the compressive strength of the composition at 4 hours will be greater than about 20 psi, will be greater than about 30 psi, will be greater than about 40 psi, or will be greater than about 50 psi. In certain embodiments, the compressive strength of the composition at 4 hours will be less than about 100 psi, will be less than about 90 psi, will be less than about 80 psi, will be less than about 70 psi, will be less than about 60 psi, will be less than about 50 psi, will be less than about 40 psi, will be less than about 55 psi, or will be less than about 65 psi.

In an embodiment, the compressive strength of a composition of the present disclosure at 28 days will be between about 75 psi and about 500 psi, between about 100 psi and about 400 psi, between about 125 psi and about 300 psi. In additional embodiments, the compressive strength of the composition at 28 days will be greater than about 75 psi, will be greater than about 100 psi, will be greater than about 125 psi, will be greater than about 150 psi, will be greater than about 175 psi, will be greater than about 200 psi, or will be greater than about 250 psi. In certain embodiments, the compressive strength of the composition at 28 days will be less than about 400 psi, less than about 350 psi, less than about 250 psi, less than about 200 psi, less than about 175 psi, less than about 150 psi, or less than about 125 psi.

Similar to compressive strength, compositions of the present disclosure will have a range of penetration resistances at various times after the addition of a composition to a trench depending on the desired properties of the composition. For example, and similar to faster set times, a higher earlier penetration resistance is advantageous when working when backfilling trenches in a roadway or other highly traveled area. The higher, earlier penetration resistance allows for the backfilled void to be patched and reopened for use at an earlier time. Again, despite the desire for a high earlier penetration resistance the final compressive strength must not exceed the local agency standards, i.e., maintain good removability modulus numbers.

In certain embodiments, the penetration resistance is measured at 1 hour, 2 hours, 4 hours, 6 hours, and 8 hours. In an embodiment, the penetration resistance of a composition of the present disclosure at 2 hours is between about 1.0 tsf and about 150 tsf, between about 1.5 tsf and about 125 tsf, between about 1.5 tsf and about 100 tsf, between about 1.5 tsf and about 75 tsf, between about 2.0 tsf and about 70 tsf, between about 2.5 tsf and about 70 tsf. In additional embodiments, the penetration resistance of a composition at 2 hours will be greater than about 1.0 tsf, great than about 1.5 tsf, greater than about 2.0 tsf, greater than about 5 tsf, greater than about 10 tsf, greater than about 15 tsf, greater than about 30 tsf, greater than about 50 tsf, greater than about 75 tsf, greater than about 90 tsf, greater than about 110 tsf, greater than about 120 tsf, or greater than about 130 tsf. In additional embodiments, the penetration resistance of a composition at 2 hours will be less than about 150 tsf, less than about 125 tsf, less than about 100 tsf, less than about 75 tsf, less than about 50 tsf, less than about 25 tsf, less than about 15 tsf, or less than about 10 tsf.

In an embodiment, the penetration resistance of a composition of the present disclosure at 4 hours is between about 4 tsf and about 300 tsf, between about 4.5 tsf and about 250 tsf, between about 4.5 tsf and about 200 tsf, between about 30 tsf and about 150 tsf, between about 50 tsf and about 200 tsf, or between about 80 tsf and about 180 tsf. In additional embodiments, the penetration resistance of a composition at 4 hours will be greater than about 4 tsf, greater than about 10 tsf, greater than about 30 tsf, greater than about 40 tsf, greater than about 80 tsf, greater than about 100 tsf, greater than about 110 tsf, greater than about 120 tsf, greater than about 140 tsf, greater than about 150 tsf, greater than about 60 tsf, greater than about 160 tsf, or greater than about 170 tsf. In additional embodiments, the penetration resistance of a composition at 4 hours will be less than about 300 tsf, less than about 250 tsf, less than about 200 tsf, less than about 150 tsf, or less than about 100 tsf.

Compositions of the present disclosure are designed to reduce surface (bleed) water on the surface of the compositions following application to a trench in certain embodiments. The reduction and/or elimination of surface (bleed) water allows quicker application of a pavement patch (traditional of fast-curing) because there is no surface (bleed) water between the two surfaces to cause interference. In certain embodiments, the reduction in bleed water is measured by evaluating the shrinkage of the composition using ASTM C940. In certain embodiments, the shrinkage of a composition of the present disclosure is less than about 10%, less than about 9%, less than about 8%, less than about 7%, less than about 6%, less than about 5%, less than about 4%, less than about 3%, less than about 2.5%, less than about 2.0%, less than about 1.5%, less than about 1.0%, less than about 0.5%, or less than 0.05%. The reduction in surface water can also be assessed by visual observation and/or testing with hot crack sealers or pavement materials that generate heat.

In an embodiment of the present disclosure, an important consideration is the possible re-excavation of the backfilled composition by standard or ordinary excavation equipment. One measure of how easily a previously backfilled composition can be removed is the Removability Modulus ("RE"). The Removability Modulus is a commonly used industry standard for assigning a value to how easily a backfilled composition can be removed. The lower the RE number the easier the backfilled composition can be re-excavated. The Removability Modulus can be determined by the following formula:

$$RE = \frac{W^{1.5} \times 104 \times C^{0.5}}{10^6}$$

$W$ = in-situ unit weight (pcf)

$C$ = 28 day compressive strength (psi)

In an embodiment of the present disclosure, the RE factor of a composition is between about 1.0 and about 4.5, between about 1.2 and about 4.0, between about 1.5 and about 3.7, between about 1.7 and about 3.6, or between about 1.8 and about 3.5

In additional embodiments of the present disclosure, the RE factor of a composition less than about 5.0, less than about 4.5, less than about 4.0, less than about 3.8, less than about 3.7, less than about 3.5, less than about 3.2, less than about 3.0, or less than about 2.8. In other embodiments of the present disclosure, the RE factor of a composition is greater than about 1.0, greater than about 1.5, greater than about 1.7, greater than about 2.0, greater than about 2.2, greater than about 2.4, or greater than about 2.5.

In some embodiments, the compositions of the present disclosure may further comprise a water reducer. Water reducers may be used when a higher final strength is desired at a specified density and fluidity. Water reducers can also create more fluidity with the same water content and strength levels. In some embodiments the water reducer will be powder while in other embodiments it will be a liquid water reducer. In an embodiment, the water reducer is CHRYSO® 150 or similar composition suitable for use in the disclosed compositions. A water reducer is a chemical (e.g., chemical composition) that allows a mixture to maintain the same fluidity with less water or more fluidity with the same amount of water.

In an embodiment, the concentration of the water reducer is between about 5 and 20 fluid ounces per cubic yard of the composition, between about 9 and about 18 fluid ounces per cubic yard of the composition, or between about 11 and 16 fluid ounces per cubic yard of the composition. In certain embodiments, the concentration of the water reducer is less than 20 ounces per cubic yard of the composition, less than 18 ounces per cubic yard of the composition, less than 15 ounces per cubic yard of the composition, less than 12 ounces per cubic yard of the composition, less than 10 ounces per cubic yard of the composition, less than 7 ounces per cubic yard of the composition, or less than 5 ounces per cubic yard of the composition. In certain embodiments, the concentration of the water reducer is greater than about 2 ounces per cubic yard of the composition, greater than about 5 ounces per cubic yard of the composition, greater than about 7 ounces per cubic yard of the composition, greater than about 9 ounces per cubic yard of the composition, greater than about 11 ounces per cubic yard of the composition, greater than about 14 ounces per cubic yard of the composition, or greater than about 16 ounces per cubic yard of the composition.

In some embodiments, the compositions of the present disclosure may further comprise a polymer, e.g., hydroxypropyl methylcellulose, based on the desired properties of the compositions. The addition of a polymer or multiple polymers helps reduce water in a composition; helps achieve greater air entrainment of a composition; and helps improve suspension of sand particles (or aggregates) in the mix. All of which result in a more fluid, non-segregating, minimal bleed water mix, while using less water. In an embodiment, the concentration of the polymer is between about 0.05% and about 0.12% by weight of dry solids in the composition, between about 0.07% and about 0.10% by weight of dry solids in the composition, or between about 0.05% and about 0.10% by weight of dry solids in the composition. In certain embodiments, the concentration of the polymer is greater than about 0.05%, is greater than about 0.075%, is greater than about 0.10%, or is greater than about 0.15%. In certain embodiments, the concentration of the polymer is less than about 0.15%, is less than about 0.10%, is less than about 0.075%, or is less than about 0.05%.

Some compositions of the present disclosure will include the addition of foam, e.g., the amount of air content within a composition can be controlled by varying cellular foam, which can be optimized for the ultimate strength gain desired, the ambient temperature during the backfilling process, and the desired final properties. In specific embodiments, the air content may be achieved by adding a preformed cellular foam, e.g., Aerlite-ix foam liquid concentrate available from Aerix Industries, 7020 Snowdrift Road, Suite 102, Allentown, PA 18106 or 5916 McIntyre St, Golden, CO 80403. The cellular foam may be pervious or non-pervious, and pre-foamed thereby reducing or alleviating the need to vigorously agitate the composition to activate the air entraining agent. Any suitable foaming agent may be used that achieves the desired end properties as described herein, e.g., an anionic foaming agent, a cationic foaming agent or a non-ionic foaming agent. An example of a pervious foam is AQUAERiX. Examples of a non-pervious foam are Aerlite or Aerlite-ix. When water penetration is not desired, a non-pervious cellular foam is normally used. Suitable cellular foam is available from a variety of sources, e.g., Aerix industries; Provoton Foam Concrete, 28 East Larkspur Lane, Bristol, IL 60512; Allied Foam Tech Corp., 146 Keystone Dr. Montgomeryville, PA 18936; and Vermillion LLC and Associates, 2176 Sargent Daly Dr., Chattanooga, TN 37421. The choice of an appropriate cellular foam is within one of skill in the art and may be dictated by cost, environmental concerns, or the need to meet the requirements of local or national agencies. In some embodiments, the foaming agent will conform to ASTM C869 and C796, in other embodiments the air entraining agent conforms to ASTM C260.

Beneficial air content in these accelerated mixtures can also be obtained with conventional air entraining admixtures (AEA) for Portland cement concrete, and generated through the mixing process. The amount of air entraining agent necessary for a given composition will vary with the desired air content, e.g., the desired final compressive strength. In some embodiments, the final air content of the composition will be between about 10% to about 40%, about 15% to about 35%, about 20% to about 30%. In some embodiments, the final air content will be less than about 40%, less than about 35%, less than about 30%, less than about 25%, less than about 20%, less than about 15%. In some embodiments, the final air content will be greater than about 10%, greater than about 15%, greater than about 20%, greater than about 25%, or greater than about 30%.

The present disclosure also provides for a method of backfilling a trench with a disclosed composition. In one embodiment, a method of backfilling a trench with a composition comprising recycled trench spoils. For example, a method includes excavating a trench or void, maintaining some portion of the excavated trench spoils for addition to a composition, mixing a composition of the present disclosure that includes some portion of the excavated trench spoils, and filing the trench or void with the composition that includes the recycles trench spoils.

EXAMPLES

Example 1

Eleven embodiments of the CLSM compositions described above were prepared for testing and evaluation. The components for each of the eleven compositions is set forth below based on pounds per cubic yard (lb/cy) and percent (%) of the composition by weight. The cement in each composition is Portland cement from CEMEX. The water for each composition is standard tap water. The sand for G400-AA, G350-AA, G300-AA, and BHF compositions is from Austin Aggregates. The sand for G300-WR and G300-WR-P is typical C33 concrete sand. The Bag House Fines (BHFs) for the BHF compositions are from Martin Marietta's Spec Asphalt Plant at 18401 West Colfax Ave Golden, Colorado. The sodium bicarbonate (SBC) for each composition, if any, is from Skymine. The polymer for each composition, if any, is hydroxypropyl methylcellulose from Bio Polymer Industries 2001 North 170th East Ave., Tulsa, OK 74116. The water reducer for G300-WR-P is disclosed in ounces per 100 lbs of cement in the pounds per cubic yard table. Mix ID's are consistent throughout the Examples and descriptions of the cement, water, sand, BHF, SBC, and Polymer are consistent throughout the Examples unless otherwise noted.

TABLE 1

Components of Eleven Embodiments of the CLSM Compositions.

| | Composition lb/cy | | | | | | Composition % | | | | | |
|---|---|---|---|---|---|---|---|---|---|---|---|---|
| Mix ID | Cement | Water | Sand | BHF | SBC | Polymer | Cement | Water | Sand | BHF | SBC | Polymer |
| G400-AA | 400 | 534 | 2650 | 0 | 100 | 0 | 10.9% | 14.5% | 71.9% | 0.0% | 2.7% | 0.0% |
| G350-AA | 350 | 534 | 2647 | 0 | 87.5 | 0 | 9.7% | 14.8% | 73.2% | 0.0% | 2.4% | 0.0% |
| G300-AA | 300 | 534 | 2697 | 0 | 75 | 0 | 8.3% | 14.8% | 74.8% | 0.0% | 2.1% | 0.0% |
| G300-WR | 300 | 495 | 2775 | 0 | 75 | 0 | 8.2% | 13.6% | 76.1% | 0.0% | 2.1% | 0.0% |

TABLE 1-continued

Components of Eleven Embodiments of the CLSM Compositions.

| | Composition lb/cy | | | | | | Composition % | | | | | |
|---|---|---|---|---|---|---|---|---|---|---|---|---|
| Mix ID | Cement | Water | Sand | BHF | SBC | Polymer | Cement | Water | Sand | BHF | SBC | Polymer |
| G300-WR-P | 300 | 479 | 2775 | 0 | 75 | 3 | 8.3% | 13.2% | 76.4% | 0.0% | 2.1% | 0.1% |
| BHF-300 | 200 | 542 | 2437 | 300 | 50 | 0 | 5.7% | 15.4% | 69.1% | 8.5% | 1.4% | 0.0% |
| BHF-500 | 200 | 542 | 2247 | 500 | 50 | 0 | 5.7% | 15.3% | 63.5% | 14.1% | 1.4% | 0.0% |
| BHF-700 | 200 | 550 | 2035 | 700 | 50 | 0 | 5.7% | 15.6% | 57.6% | 19.8% | 1.4% | 0.0% |
| BHF-900 | 200 | 584 | 1750 | 900 | 50 | 0 | 5.7% | 16.8% | 50.2% | 25.8% | 1.4% | 0.0% |
| BHF-1100 | 200 | 630 | 1430 | 1100 | 50 | 0 | 5.9% | 18.5% | 41.9% | 32.3% | 1.5% | 0.0% |
| BHF-1300 | 200 | 719 | 1010 | 1300 | 50 | 0 | 6.1% | 21.9% | 30.8% | 39.6% | 1.5% | 0.0% |

Example 2

Figure 2:
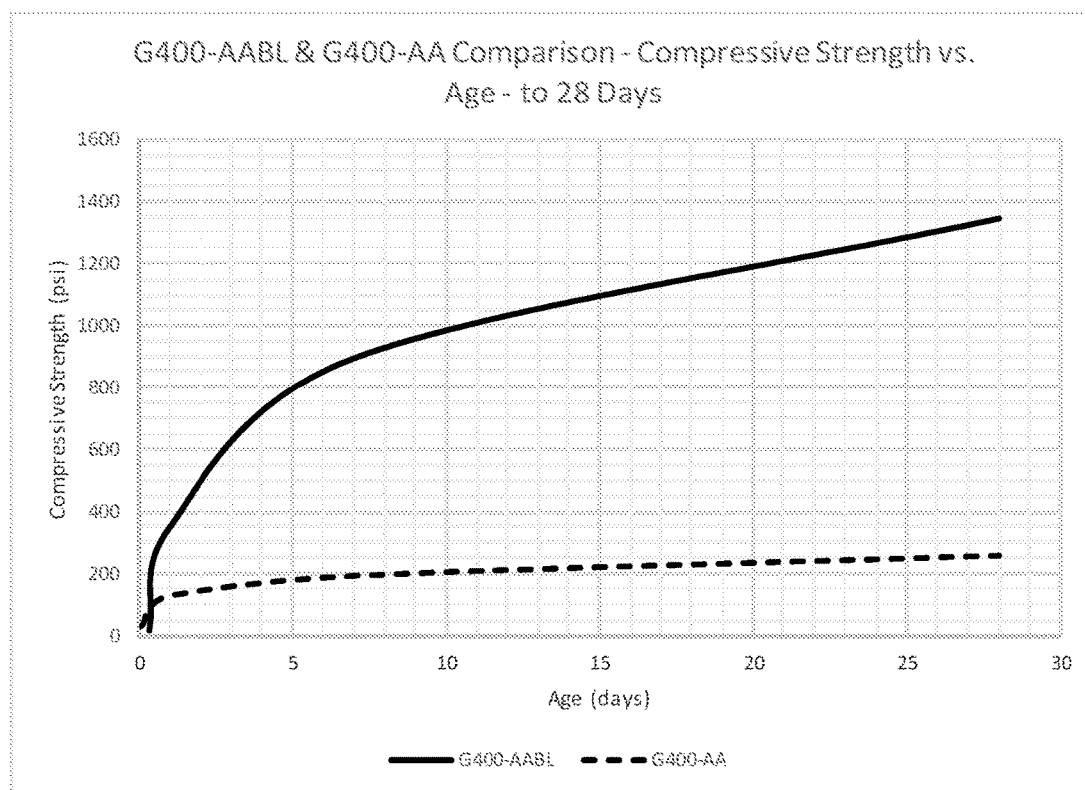
FIG. 2.

Some of the above compositions, in addition to variations of the above compositions from the present disclosure (composition components disclosed in Table 2), were evaluated for penetration resistance using a pocket penetrometer (tsf) at 2 hours, 4 hours, 6 hours, and 8 hours as disclosed in Table 3. In addition, the compressive strength was evaluated using ASTM D4832 (psi) at 2 hours, 4 hours, 8 hours, 1 day, 7 days, and 28 days as disclosed in Table 3. Finally, the removability modulus (RE) for certain compositions was calculated as disclosed in Table 3. The polymer content is based on the total weight of dry solids. A "-" in the Tables indicates that no measurement was taken at that time point. Importantly, the addition of SBC to a composition of the present disclosure dramatically decreases the set time of the composition (e.g., increases early penetration resistance and compressive strength) while also decreasing the final compressive strength. For example, compare G400-AABL with G400-AA in FIG. 1, which is a graph of the compressive strength (Y-axis (psi)) of G400-AABL (solid line) and G400-AA (dotted line) against the age in hours (X-axis (first 12 hours)) post mixing, with FIG. 2, which is a graph of the compressive strength (Y-axis (psi)) of G400-AABL (solid line) and G400-AA (dotted line) against the age in days (X-axis (first 28 days)) post mixing.

TABLE 2

Components of Embodiments of the CLSM Compositions.

| | Composition (#/CY) | | | | | | Composition (%) | | | | | |
|---|---|---|---|---|---|---|---|---|---|---|---|---|
| Mix ID | Cement | Sand | Water | SBC | Chryso P150 | Polymer H400 | Cement | Sand | Water | SBC | Chryso P150 | Polymer H400 |
| G-300 | 300 | 2700 | 534 | 75 | 0 | 0 | 8.3% | 74.8% | 14.8% | 2.1% | 0.00% | 0.0% |
| G-400 | 400 | 2650 | 534 | 100 | 0 | 0 | 10.9% | 71.9% | 14.5% | 2.7% | 0.00% | 0.0% |
| G-300-2 | 300 | 2700 | 534 | 75 | 0 | 0 | 8.3% | 74.8% | 14.8% | 2.1% | 0.00% | 0.0% |
| G-400-2 | 400 | 2650 | 534 | 100 | 0 | 0 | 10.9% | 71.9% | 14.5% | 2.7% | 0.00% | 0.0% |
| G300-BL | 300 | 2775 | 540 | 0 | 0 | 0 | 8.3% | 76.8% | 14.9% | 0.0% | 0.00% | 0.0% |
| G300-P | 300 | 2775 | 540 | 75 | 0 | 3 | 8.1% | 75.1% | 14.6% | 2.0% | 0.00% | 0.1% |
| G300-3W | 300 | 2775 | 495 | 75 | 0.72 | 0 | 8.2% | 76.1% | 13.6% | 2.1% | 0.02% | 0.0% |
| G300-6W | 300 | 2775 | 495 | 75 | 1.44 | 0 | 8.2% | 76.1% | 13.6% | 2.1% | 0.04% | 0.0% |
| G300-3W-P | 300 | 2775 | 479 | 75 | 0.72 | 3 | 8.3% | 76.4% | 13.2% | 2.1% | 0.02% | 0.1% |
| G300-6W-P | 300 | 2775 | 479 | 75 | 1.44 | 3 | 8.3% | 76.4% | 13.2% | 2.1% | 0.04% | 0.1% |
| G300-WR | 300 | 2775 | 495 | 75 | 0.72 | 0 | 8.2% | 76.1% | 13.6% | 2.1% | 0.02% | 0.0% |
| G300-WR-P | 300 | 2775 | 479 | 75 | 0.72 | 3 | 8.3% | 76.4% | 13.2% | 2.1% | 0.02% | 0.1% |
| G400-AABL | 400 | 2650 | 534 | 0 | 0 | 0 | 11.2% | 73.9% | 14.9% | 0.0% | 0.00% | 0.0% |
| G400-AA | 400 | 2650 | 534 | 100 | 0 | 0 | 10.9% | 71.9% | 14.5% | 2.7% | 0.00% | 0.0% |
| G400-SC | 400 | 2650 | 534 | 100 | 0 | 0 | 10.9% | 71.9% | 14.5% | 2.7% | 0.00% | 0.0% |
| G-300-AA | 300 | 2697 | 534 | 75 | 0 | 0 | 8.3% | 74.8% | 14.8% | 2.1% | 0.00% | 0.0% |
| G-350-AA | 350 | 2647 | 534 | 87 | 0 | 0 | 9.7% | 73.2% | 14.8% | 2.4% | 0.00% | 0.0% |
| G300-AA-2 | 300 | 2697 | 534 | 75 | 0 | 0 | 8.3% | 74.8% | 14.8% | 2.1% | 0.00% | 0.0% |
| G350-AA-2 | 350 | 2647 | 534 | 87 | 0 | 0 | 9.7% | 73.2% | 14.8% | 2.4% | 0.00% | 0.0% |

TABLE 3

Compressive Strength Summary With Removability Modulus.

| | Unit Weight | Penetration Resistance (TSF) | | | | Compressive Strengths (psi) | | | | | | |
|---|---|---|---|---|---|---|---|---|---|---|---|---|
| Mix ID | (pcf) | 2-hour | 4-hour | 6-hour | 8-hour | 2-hour | 4-hour | 8-hour | 1-day | 7-day | 28-day | RE |
| G-300 | 130.2 | 52 | 115 | — | 280 | 20 | 59 | 114 | 156 | 243 | 340 | 2.85 |
| G-400 | 131.6 | 158 | 202 | — | 345 | 27 | 97 | 162 | 250 | 370 | 463 | 3.38 |
| G-300-2 | — | 72 | 144 | 230 | 253 | — | — | — | — | — | — | — |
| G-400-2 | — | 144 | 270 | 374 | — | — | — | — | — | — | — | — |
| G300-BL | — | 2.75 | 50 | 95 | — | — | — | — | — | — | — | — |

TABLE 3-continued

Compressive Strength Summary With Removability Modulus.

| Mix ID | Unit Weight (pcf) | Penetration Resistance (TSF) | | | | Compressive Strengths (psi) | | | | | | RE |
|---|---|---|---|---|---|---|---|---|---|---|---|---|
| | | 2-hour | 4-hour | 6-hour | 8-hour | 2-hour | 4-hour | 8-hour | 1-day | 7-day | 28-day | |
| G300-P | — | 2 | 36 | 46 | — | — | — | — | — | — | — | — |
| G300-3W | — | 4.25 | 58 | 158 | — | — | — | — | — | — | — | — |
| G300-6W | — | 3 | 42 | 130 | — | — | — | — | — | — | — | — |
| G300-3W-P | — | 0.5 | 3.5 | 29 | — | — | — | — | — | — | — | — |
| G300-6W-P | — | 0.75 | 4.3 | 36 | — | — | — | — | — | — | — | — |
| G300-WR | 130.4 | 72 | 270 | 308 | — | — | 69 | 125 | 181 | 276 | 391 | 3.06 |
| G300-WR-P | 118.8 | 2.5 | 130 | 173 | 220 | — | 28 | 60 | 100 | 152 | 220 | 2.00 |
| G400-AABL | 133.0 | 0 | 0.5 | 4.25 | 81 | — | — | 17 | 350 | 895 | 1345 | 5.85 |
| G400-AA | 132.5 | 140 | 260 | 302 | 390 | 32 | 46 | 91 | 130 | 193 | 258 | 2.55 |
| G400-SC | 136.1 | — | — | — | — | — | 78 | — | 145 | 298 | 497 | 3.68 |
| G-300-AA | 132.2 | — | — | — | — | 14 | 50 | — | 104 | 187 | 271 | 2.60 |
| G-350-AA | 132.4 | — | — | — | — | 17 | 46 | — | 136 | 211 | 265 | 2.58 |
| G300-AA-2 | 130.8 | — | — | — | — | 27 | 44 | — | 118 | 207 | 314 | 2.76 |
| G350-AA-2 | 131.0 | — | — | — | — | 26 | 54 | — | 110 | 173 | 256 | 2.49 |

Example 3

To optimize the amount of SBC necessary to achieve early penetration resistance, the G400-AA Mix ID was evaluated with 0% SBC to 25% SBC (by weight of the cement) in Mix Nos. 1-5. Mix No. 1 had 0% SBC while Mix No. 5 had 25% sodium bicarbonate. The penetration resistances of the varying SBC content Mix Nos. were tested at 1 hour, 2 hours, 4 hours, 6 hours, and 8 hours. Generally, as the percentage of SBC is increased within the G400-AA mix the quicker the penetration resistance (tsf) increase over the tested time. The penetration resistance was measure using a pocket penetrometer. A SBC content of between about 15% and about 25% by weight of the cement has preferred penetration resistances in the below experiments.

TABLE 4

G400-AA Mix Penetration Resistance.
G400-AA Mix Penetration resistance with varying SBC content.

| Mix No. | SBC (% by wght. Cement) | Composition (%) | | | | Penetration Resistance (tsf) | | | | |
|---|---|---|---|---|---|---|---|---|---|---|
| | | Cement | Sand | Water | SBC | 1-hr | 2-hr | 4-hr | 6-hr | 8-hr |
| 1 | 0 | 11.2 | 73.9 | 14.9 | 0.0 | 0 | 0 | 0.5 | 4.25 | 81 |
| 2 | 10 | 11.0 | 73.1 | 14.7 | 1.1 | 0.25 | 2.75 | 29 | 101 | 187 |
| 3 | 15 | 11.0 | 72.7 | 14.7 | 1.6 | 0.25 | 95 | 150 | 216 | 346 |
| 4 | 20 | 10.9 | 72.3 | 14.6 | 2.2 | 0.25 | 130 | 302 | 346 | 390 |
| 5 | 25 | 10.9 | 71.9 | 14.5 | 2.7 | 0.25 | 140 | 260 | 302 | 390 |
| | | | | | Hours | 1 | 2 | 4 | 6 | 8 |

Example 4

The penetration resistance and ball drop resistance of G400-AA from Example 1 was tested at 0 hour, 0.5 hours, 1 hour, 1.5 hours, 2 hours, and 2.5 hours for a single sample of G400-AA. The drop ball resistance test (ASTM D6024) provides an indication of when the CLSM is ready for surface paving, typically when the indent circle is less than 2" in diameter. As the sample time increased, the pocket penetrometer resistance increased and Kelly ball indent (ball drop) decreased over the measured 2.5 hour timeframe. The Kelly drop ball test is often correlated with pocket penetrometer, which is easier to perform in the field on in-place material (without running test cylinders back to a lab for strength testing). Note, the 2:00 pm measurement of 100 tsf was measured using a different standard test, i.e., ASTM C403.

TABLE 5

G400-AA Mix Penetration & Ball Drop.
G400-AA mix, Penetration & Ball Drop

| Time | Interval (hr) | Pocket Pen. (tsf) | K.B. Indent (in) |
|---|---|---|---|
| 11:30 AM | 0 | 0 | — |
| 12:00 PM | 0.5 | 0 | 4.5 |
| 12:30 PM | 1 | 0.25 | 3.5 |
| 1:00 PM | 1.5 | 2.5 | 2.5 |

TABLE 5-continued

G400-AA Mix Penetration & Ball Drop.
G400-AA mix, Penetration & Ball Drop

| Time | Interval (hr) | Pocket Pen. (tsf) | K.B. Indent (in) |
|---|---|---|---|
| 1:30 PM | 2 | 4.5 | 2 |
| 2:00 PM | 2.5 | 100 | 1.5 |

Example 6

The penetration resistance and ball drop resistance of G350-AA from Example 1 was tested at 0 hour, 0.5 hours, 1 hour, 1.5 hours, and 2 hours for a single sample of G350-AA. As the sample time increased the pocket penetrometer resistance increased and kettle ball indent (ball drop) decreased over the measured 2 hour timeframe.

TABLE 7

G350-AA Mix Penetration & Ball Drop.
G350-AA mix, Penetration & Ball Drop

| Time | Interval (hr) | Pocket Pen. (tsf) | K.B. Indent (in) |
|---|---|---|---|
| 10:15 AM | 0 | 0 | — |
| 10:45 AM | 0.5 | 0 | 5 |
| 11:15 AM | 1 | 0.25 | 3 |
| 11:45 AM | 1.5 | 4.5 | 2 |
| 12:15 AM | 2 | Max | 1.75 |

Example 7

To determine the ability to use BHF as a replacement for sand in CLSM compositions of the present disclosure, several compositions without (200-BL) and with BHF were prepared and evaluated for the calculation of water to cement ratio (W/C), unit weight (UW (pcf)) using a ASTM C138, spread (inches) using a ASTM D6103, and shrinkage using ASTM C940 as disclosed in Table 8, penetration resistance (psi) using a pocket penetrometer as disclosed in Table 9, and compressive strength (psi) using ASTM D4832 as disclosed in Table 10.

The addition of BHF to accelerated flowable fill compositions of the present disclosure allows a reduction in cement and SBC without any sacrifice in results. For example, compare G400-AA from Example 1 to BHF-300 and BHF-500 in Tables 8-10.

TABLE 8

Accelerated BHF Compositions: Measurement of W/C, UW, Spread, and Shrinkage.

| MIX ID | Composition (lb/CY) | | | | | W/C | UW (pcf) | Spread D6103 (in) | C490(%) |
|---|---|---|---|---|---|---|---|---|---|
| | Cement | Sand | Water | BHF | SBC | | | | |
| 200-BL | 200 | 2750 | 542 | 0 | 0 | 2.71 | 130.0 | 4-6 | 3.8 |
| BHF-300 | 200 | 2440 | 542 | 300 | 50 | 2.71 | 132.9 | 10 | 1.2 |
| BHF-500 | 200 | 2250 | 542 | 500 | 50 | 2.71 | 133.4 | 11 | 1.2 |
| BHF-700-BL | 200 | 2035 | 550 | 700 | 0 | 2.75 | 132.4 | 10 | — |
| BHF-700 | 200 | 2035 | 550 | 700 | 50 | 2.75 | 133.3 | 10 | 0 |
| B-700-100 | 100 | 2160 | 542 | 700 | 25 | 5.42 | 131.6 | 12 | — |
| BHF-900 | 200 | 1750 | 584 | 900 | 50 | 2.92 | 130.7 | 10 | 0 |
| BHF-1100 | 200 | 1430 | 630 | 1100 | 50 | 3.15 | 127.3 | 10 | 0 |
| BHF-1300 | 200 | 1010 | 719 | 1300 | 50 | 3.60 | 123.8 | 11.5 | 0.6 |
| BHF-1690 | 200 | 0 | 959 | 1690 | 50 | 4.80 | 110.0 | 10 | — |

TABLE 9

BHF Compositions: Measurement of Penetration Resistance.

| MIX ID | Composition (lb/CY) | | | | | Penetration Resistance (tsf) | | | | |
|---|---|---|---|---|---|---|---|---|---|---|
| | Cement | Sand | Water | BHF | SBC | 1-hr | 2-hr | 4-hr | 6-hr | 8-hr |
| 200-BL | 200 | 2750 | 542 | 0 | 0 | 0 | 0 | 1 | 4.5 | — |
| BHF-300 | 200 | 2440 | 542 | 300 | 50 | 0.25 | 52 | 161 | 181 | 196 |
| BHF-500 | 200 | 2250 | 542 | 500 | 50 | 1 | 50 | 167 | 173 | 202 |
| BHF-700-BL | 200 | 2035 | 550 | 700 | 0 | — | — | — | — | — |
| BHF-700 | 200 | 2035 | 550 | 700 | 50 | 1.5 | 65 | 130 | 164 | 196 |
| B-700-100 | 100 | 2160 | 542 | 700 | 25 | 0 | 0.75 | 3.5 | 48 | 69 |
| BHF-900 | 200 | 1750 | 584 | 900 | 50 | 0.5 | 40 | 130 | 170 | 202 |
| BHF-1100 | 200 | 1430 | 630 | 1100 | 50 | 0.5 | 3.75 | 115 | 153 | 178 |
| BHF-1300 | 200 | 1010 | 719 | 1300 | 50 | 0 | 1.5 | 4.5 | 75 | 86 |
| BHF-1690 | 200 | 0 | 959 | 1690 | 50 | — | — | — | — | — |
| | | | | | Days | 0.042 | 0.083 | 0.167 | 0.250 | 0.333 |
| | | | | | Hours | 1 | 2 | 4 | 6 | 8 |

TABLE 10

BHF Compositions: Measurement of Compressive Strength.

| MIX ID | Composition (lb/CY) | | | | | Compressive Strength (psi) | | | | |
|---|---|---|---|---|---|---|---|---|---|---|
| | Cement | Sand | Water | BHF | SBC | 2-hr | 4-hr | 1-day | 7-day | 28-day |
| 200-BL | 200 | 2750 | 542 | 0 | 0 | 0 | 0 | 70 | 191 | 248 |
| BHF-300 | 200 | 2440 | 542 | 300 | 50 | — | 43 | 105 | 181 | 244 |

TABLE 10-continued

BHF Compositions: Measurement of Compressive Strength.

| | Composition (lb/CY) | | | | | Compressive Strength (psi) | | | | |
|---|---|---|---|---|---|---|---|---|---|---|
| MIX ID | Cement | Sand | Water | BHF | SBC | 2-hr | 4-hr | 1-day | 7-day | 28-day |
| BHF-500 | 200 | 2250 | 542 | 500 | 50 | 31 | 54 | 137 | 203 | 258 |
| BHF-700-BL | 200 | 2035 | 550 | 700 | 0 | 0 | 0 | 56 | 203 | 350 |
| BHF-700 | 200 | 2035 | 550 | 700 | 50 | 34 | 53 | 137 | 213 | 311 |
| B-700-100 | 100 | 2160 | 542 | 700 | 25 | — | 9 | 36 | 77 | 109 |
| BHF-900 | 200 | 1750 | 584 | 900 | 50 | 26 | 29 | 108 | 185 | 275 |
| BHF-1100 | 200 | 1430 | 630 | 1100 | 50 | — | 24 | 105 | 186 | 280 |
| BHF-1300 | 200 | 1010 | 719 | 1300 | 50 | — | 18 | 93 | 176 | 287 |
| BHF-1690 | 200 | 0 | 959 | 1690 | 50 | — | 6 | 31 | 93 | 166 |
| | | | | | Days | 0.083 | 0.167 | 1 | 7 | 28 |
| | | | | | Hours | 2 | 4 | 24 | 168 | 672 |

The difference between a composition without BHF (G400-AA) and a composition with BHF (BHF-300 and BHF-500) was evaluated by comparing compressive strength (psi) for each composition as 2 hours, 4 hours, 1 day, 7 day, and 28 days. Table 11 demonstrates that the BHF compositions have comparable compressive strength profiles to compositions without BHF, but with only half the quantity of cement and SBC, resulting in significant cost savings. Notably, the BHF compositions achieved similar performance parameters including high fluidity, fast setting times, and no excess bleed water from segregations/consolidation at the time of setting.

TABLE 11

Comparison of Compositions With & Without BHF.

| | Composition (lb/CY) | | | | | Compressive Strength (psi) | | | | |
|---|---|---|---|---|---|---|---|---|---|---|
| MIX ID | Cement | Sand | Water | BHF | SBC | 2-hr | 4-hr | 1-day | 7-day | 28-day |
| G400-AA | 400 | 2750 | 542 | 0 | 100 | 32 | 46 | 130 | 193 | 258 |
| BHF-300 | 200 | 2440 | 542 | 300 | 50 | — | 43 | 105 | 181 | 244 |
| BHF-500 | 200 | 2250 | 542 | 500 | 50 | 31 | 54 | 137 | 203 | 258 |
| | | | | | Days | 0.083 | 0.167 | 1 | 7 | 28 |
| | | | | | Hours | 2 | 4 | 24 | 168 | 672 |

Example 8

Figure 3:
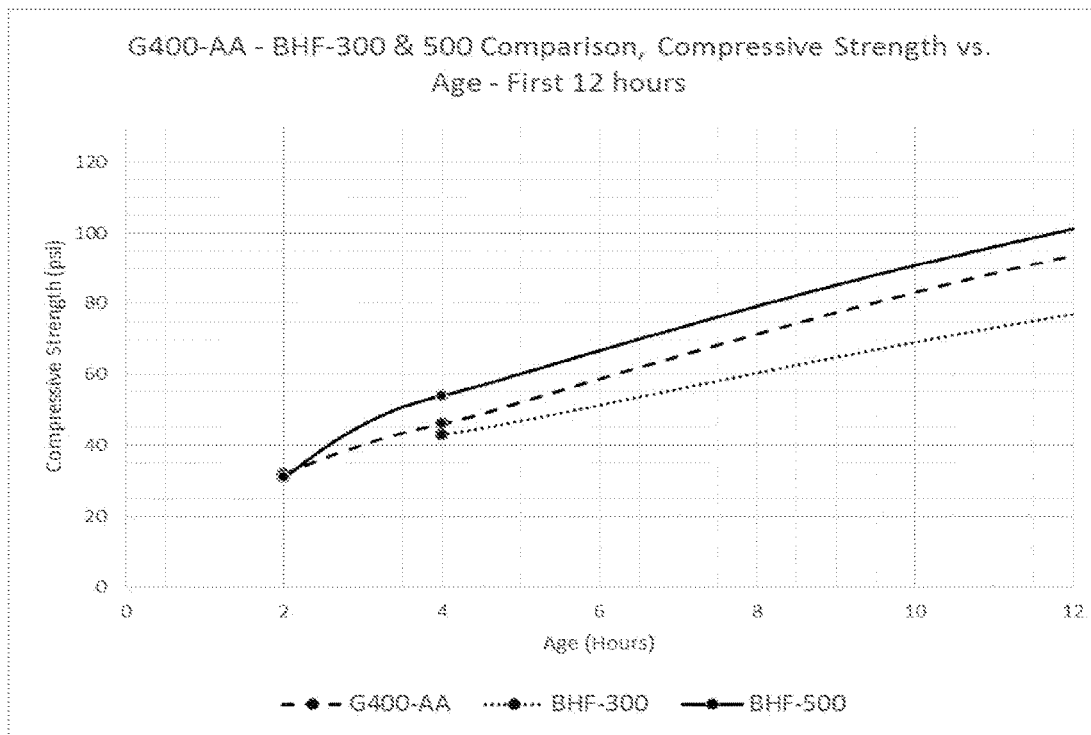
FIG. 3.
Figure 4:
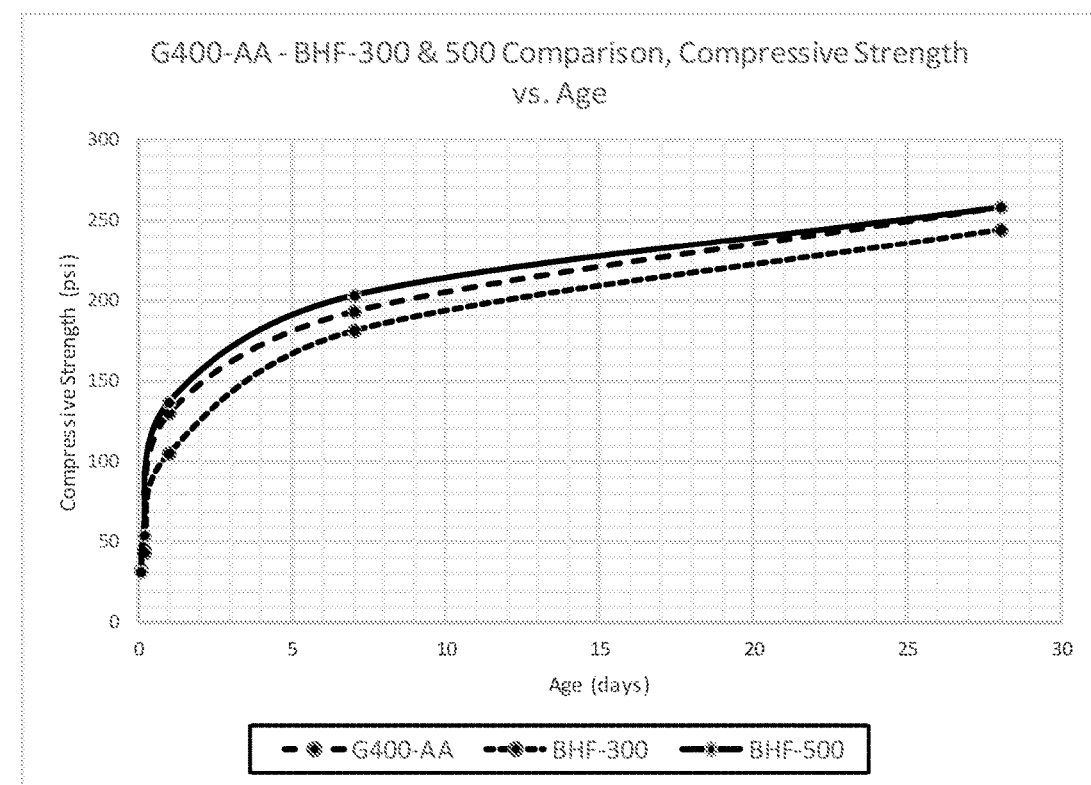
FIG. 4.

The results from Table 11 are graphed in FIG. 3, which is a graph of the compressive strength (Y-axis (psi)) of G400-AA (hyphened line), BHF-300 (dotted line), and BHF-500 (solid line) against the age in hours (X-axis (first 12 hours)) post mixing and FIG. 4, which is a graph of the compressive strength (Y-axis (psi)) of G400-AA (hyphened line), BHF-300 (dotted line), and BHF-500 (solid line) against the age in days (X-axis (first 28 days)) post mixing to clarify the ability of a composition including BHF (e.g., BHF-300 and BHF-500) to perform similarly to a composition with double the amount of cement and SBC.

Example 9

To investigate the differences that rapid mixing of an on-site volumetric truck, versus the slow mixing of traditional batch plant mixing and transportation in a ready-mixed drum truck, the following testing was performed. The effect of the mixing speed on three different compositions of the present disclosure was investigated for G-300AA, G350-AA, and G400-AA. For each composition, three different batches were prepared, e.g., G300-AA-BL, G300-AA-S, and G300-AA-Q. For example, all of the G300-AA are the same composition. The difference between each batch within a composition was either the sodium bicarbonate content (0% or 25%) or the mix and place speed (slow versus fast.) The composition of each mix is the same as the like named Mix IDs in Example 1.

The mix and place speed means is the rate at which the mix was prepared and placed. For the "Fast" mix & place (suffix Q), the composition was mixed quickly, just long enough for the components to be thoroughly mixed (about 1-2 minutes), then placed and left to set. The fast mix is a small batch simulation of the rapid mix on demand type of process used in volumetric mixing trucks. In the "Slow" mix and place (suffix S), the composition underwent a prolonged mixing process, about 5 minutes, which means the mixing occurs through the initial flash set of the composition and results in a slower set time. The mixes with the "BL" suffix are baselines with no SBC for a control. For each batch of each composition the Ho and the Hf were measured along with water column. The $h_o$ is the initial height of the material column in a 1000 ml graduated cylinder per the procedure of ASTM C940. The $h_f$ is the final height of the material solids in the graduated cylinder after consolidation has stopped or the material has started to set. The water column is the column of clear water above the solids in the graduated cylinder after consolidating, in effect, a measure of the bleed water. The measurements resulted in a percent consolidation of each batch for each composition. The lower the percent consolidation equates to less surface (bleed) water on the surface of the composition.

calculated for the difference between batches within a composition by subtracting the measured UW for the fast batch from the UW for the slow batch within a given composition. In addition, the change in 28 day compressive strength was also measured by subtracting the 28 day compressive strength for the fast batch from the 28 day compressive strength for the slow batch within a given composition.

TABLE 13

Mixing Speed Impact on Strength Gain, Set Unit Weight, and 28 Day Compressive Strength.
Mixing Regieme Impact on Strength Gain, Set Unit Weight, and 28 Day Compressive Strength

| Mix ID | Cement (#/CY) | Mix & Place | UW (pcf) | G.S. (min) | 4 psi (min) | Penetration (tsf) 2-hour | 4-hour | 6-hour | 8-hour | 28 day (psi) | ΔUW | Δ28 day |
|---|---|---|---|---|---|---|---|---|---|---|---|---|
| G400-AA-Q | 400 | Fast | 131.6 | 5 | 8 | 47.5 | 173 | 230 | 230 | 297 | 3.5 | 130 |
| G400-AA-S | 400 | Slow | 135.1 | 45 | 45 | 86.4 | 225 | 274 | 317 | 427 | | |
| G350-AA-Q | 350 | Fast | 131.8 | 5 | 10 | 3 | 127 | 187 | 187 | 234 | 1.9 | 120 |
| G350-AA-S | 350 | Slow | 133.7 | 60 | 60 | 64.8 | — | 245 | — | 354 | | |
| G300-AA-Q | 300 | Fast | 132.4 | 10 | 20 | 2 | — | 115 | 130 | 165 | 1.1 | 131 |
| G300-AA-S | 300 | Slow | 133.5 | 90 | 90 | 50 | — | 188 | 188 | 296 | | |

TABLE 12

Mixing Speed Impact on Shrinkage/Settlement & ASTM C490 Testing.

| Mix ID | Cement (#/CY) | SBC (%) | Mix & Place | $h_0$ (ml) | $h_f$ (ml) | Water column (ml) | % Consolid. |
|---|---|---|---|---|---|---|---|
| G300-AA-BL | 300 | 0 | N/A | 840 | 785 | 55 | 6.5% |
| G300-AA-S | 300 | 25 | Slow | 940 | 910 | 30 | 3.2% |
| G300-AA-Q | 300 | 25 | Fast | 880 | 875 | 5 | 0.6% |
| G350-AA-BL | 350 | 0 | N/A | 830 | 780 | 50 | 6.0% |
| G350-AA-S | 350 | 25 | Slow | 940 | 910 | 30 | 3.2% |
| G350-AA-Q | 350 | 25 | Fast | 880 | 880 | 0 | 0.0% |
| G400-AA-BL | 400 | 0 | N/A | 820 | 780 | 40 | 4.9% |
| G400-AA-S | 400 | 25 | Slow | 920 | 890 | 30 | 3.3% |
| G400-AA-Q | 400 | 25 | Fast | 860 | 860 | 0 | 0.0% |

Example 10

The effect of the mixing speed on three different compositions of the present disclosure was investigated for G300-AA, G350-AA, and G400-AA. For each composition, two different batches were prepared, e.g., G300-AA-S, and G300-AA-Q. The difference between each batch within a composition was mix and place speed (slow versus fast.) The batch compositions are the same as those from previous examples.

The mix and place speed is the rate at which the mix was prepared and placed as previously described. For each batch of each composition the unit weight (UW) was measured according to ASTM C138.

For each batch of each composition the gel set (G.S.) was also measured. G.S. is when the material goes from a liquid to a solid. For example, when the small plastic cup with the composition can be turned upside down without the material falling out it is considered gel set.

For each batch of each composition the penetration resistance was measured using a pocket penetrometer (tsf) at 2 hours, 4 hours, 6 hours, and 8 hours. In addition, the compressive strength was measured according to ASTM D4832 at the time necessary to reach 4 psi (in minutes) and at 28 days. From this information, the change in UW was Example 11

The advantage of using BHF was further evaluated for use in non-quick setting (no SBC) standard flowable fill compositions by testing the compressive strength of different compositions at 1, 7, and 28 days as disclosed in Table 14 and 15. Squeegee is an industry name for a material size between sand and gravel. Squeegee meets ASTM #9 grading requirements, and is predominantly ⅛" to ¾" in size. Rock (No. 8) meets ASTM #8, which is an ASTM grading size for small rock predominantly between ¼" and ⅜". Compositions SQ-BHF-A4 and SQ-BHF-A16 were air entrained Notably, the properties of a non-accelerated flowable fill are improved by using BHF. The addition of BHF to non-quick setting (no SBC) standard flowable fill compositions resulted in significantly less consolidation and bleed water while also improving fluidity and achieving better strengths at lower cement contents.

Thus, by using BHF in these mixes, we can achieve better fluidity, less consolidation and bleeding, and make the cement paste more efficient (potentially reducing the amount necessary for a given strength range) at less cost all while utilizing a waste product that is readily available.

TABLE 14

Different Non-Accelerated Flowable Fill Compositions with BHF.

| | Composition (%) | | | | | |
|---|---|---|---|---|---|---|
| Mix ID | Cement | Rock (no. 8) | Squeegee | Sand | BHF | Water |
| CDT-BL-8 | 2.7% | 35.4% | — | 49.5% | — | 12.4% |
| CDT-700 | 2.8% | 27.2% | — | 37.8% | 19.3% | 13.0% |
| RMS-0 | 2.8% | — | — | 82.8% | — | 14.3% |
| RMS-700 | 2.8% | — | — | 61.4% | 19.9% | 15.8% |
| SQS-20 | 2.7% | — | 32.9% | 32.9% | 18.7% | 12.7% |
| SQ-BHF | 2.8% | — | 56.2% | — | 28.1% | 12.9% |
| SQ-BHF-A4 | 2.8% | — | 56.1% | — | 28.5% | 12.7% |
| SQ-BHF-A16 | 2.8% | — | 56.4% | — | 28.6% | 12.2% |

TABLE 15

The Compressive Strength Data for Compositions Of Table 14.

| | Composition (lb./CY) | | | | | | | | Slump | Compressive Strengths (psi) | | |
|---|---|---|---|---|---|---|---|---|---|---|---|---|
| Mix ID | Cement | Rock (no. 8) | Squeegee | Sand | BHF | Water | UW (pcf) | Air (%) | (in) | 1-day | 7-day | 28-day |
| CDT-BL-8 | 100 | 1290 | — | 1800 | — | 450 | 138.7 | 1.7 | 6 | 4 | 31 | 44 |
| CDT-700 | 100 | 990 | — | 1375 | 700 | 471 | 138 | 1 | 9.5 | 13 | 58 | 94 |
| RMS-0 | 100 | — | — | 2940 | — | 509 | 128.1 | 3.2 | 7 | 3 | 23 | 31 |
| RMS-700 | 100 | — | — | 2155 | 700 | 555 | 131.4 | 1 | 10.5 | 10 | 38 | 68 |
| SQS-20 | 100 | — | 1230 | 1230 | 700 | 476 | 137.4 | 0.9 | 9.5 | 11 | 54 | 86 |
| SQ-BHF | 100 | — | 2000 | — | 1000 | 460 | 138.2 | 0.9 | 8 | 14 | 71 | 120 |
| SQ-BHF-A4 | 100 | — | 2030 | — | 1030 | 460 | 133.3 | 4.5 | 8.5 | 14 | 61 | 100 |
| SQ-BHF-A16 | 100 | — | 2030 | — | 1030 | 440 | 115.6 | 17 | 9.5 | 5 | 25 | 48 |

Example 12

Embodiments of the present disclosure containing recycled trench spoils as a substitute for sand were tested against compositions containing sand to compare compressive strengths at 2 hours, 4 hours, 1 day, 7 days, and 28 days. The recycled trench spoils (from project sites in Austin, TX) tested were obtained from micro-trenches for fiber-optics using a high-speed, rotating multi-bladed rock-saw on a trenching machine, that grinds through the asphalt pavement, underlying aggregate base course, and in the native soils below. These test samples included native subgrade samples of silty sands. The composite materials tested were tested and classified as silty sand and silty sand with gravel, depending on the gravel content obtained from the asphalt and base coarse layers; these materials had no to low plasticity. Composition Mix IDs S200-TS, G300-TS, and G400-TS were prepared using recycled trench spoils as a substitute for sand. The recycled trench spoils were homogenized to a uniform mixture. G300-AA and G400-AA are compositions previously disclosed in Example 1 and contain no recycled trench spoils. Notably, recycled trench spoils can replace cement and/or sand in compositions of the present invention while achieving similar compressive strength results. For example, compare S200-TS with G400-AA (Example 1).

TABLE 16

The Recycled Trench Spoil Compositions.

| Mix ID | Cement | Spoils | Water | SBC |
|---|---|---|---|---|
| | Composition (lb./CY) | | | |
| S200-TS | 200 | 2850 | 582 | 50 |
| G300-TS | 300 | 2700 | 534 | 75 |
| G400-TS | 400 | 2600 | 526 | 100 |
| | Composition (%) | | | |
| S200-TS | 5.4% | 77.4% | 15.8% | 1.4% |
| G300-TS | 8.3% | 74.8% | 14.8% | 2.1% |
| G400-TS | 11.0% | 71.7% | 14.5% | 2.8% |

TABLE 17

Compressive Strength Results Comparison for Compositions from Table 16 and Example 1.

| | Cement | SBC | Compressive Strength (psi) | | | | |
|---|---|---|---|---|---|---|---|
| Mix ID | (#/CY) | (#/CY) | 2-hour | 4-hour | 1-day | 7-day | 28-day |
| S200-TS | 200 | 50 | 13 | 35 | 117 | 193 | 266 |
| G300-TS | 300 | 75 | 28 | 87 | 222 | 328 | 436 |
| G400-TS | 400 | 100 | 75 | 140 | 310 | 421 | 584 |
| G300-AA | 300 | 75 | 14 | 50 | 104 | 187 | 271 |
| G400-AA | 400 | 100 | 32 | 46 | 130 | 193 | 258 |
| BHF-500 | 200 | 50 | 31 | 54 | 137 | 203 | 258 |
| | | Hours | 2 | 4 | 24 | 168 | 672 |
| | | Days | 0.083 | 0.167 | 1 | 7 | 28 |

Example 13

CLSM compositions of the present disclosure can also be improved with the introduction of air content. This could be accomplished with a pre-formed cellular foam, or traditional air-entraining-admixtures for normal concrete. The advantages of incorporating air into the CLSM compositions are: easier to re-excavate in the future, increased fluidity with less batched water and less water to segregate to the surface (bleed water), and increased product yield for the raw materials.

Embodiments of the present disclosure were foamed to determine the effect of air content on the compressive strength at 4 hours, 1 day, 7 days, and 28 days. Composition Mix IDs AFS-200, AFS-300, and AFS-400 (Tables 18 and 19) were prepared using pre-formed cellular foam composed of one part Aerix G300X foam concentrate solution to 50 parts water (any foam is contemplated by the present disclosure). The foam produced averaged roughly 2.5 pcf in unit weight. Composition Mix ID QS-200-Air was prepared using an air entraining agent in a commercial truck (Table 20). The fast setting, high early strengths, and reduced long-term strengths are still exhibited with the air-entrained CLSM mixtures. In addition, air entrainment of compositions of the present disclosure resulted in compositions with less unit weight (UW).

TABLE 18

The Foamed Compositions.

| | Composition (#/CY) | | | | | Volume CF/CY | | | | |
|---|---|---|---|---|---|---|---|---|---|---|
| Mix ID | Cement | Sand | Water | SBC | Foam | Cement | Sand | Water | SBC | Foam |
| AFS-200 | 200 | 1870 | 350 | 50 | 22.5 | 1.0 | 11.9 | 5.6 | 0.4 | 9 |
| AFS-300 | 300 | 1805 | 334 | 75 | 20.5 | 1.5 | 11.5 | 5.4 | 0.5 | 8.2 |
| AFS-400 | 400 | 1730 | 321 | 100 | 20.8 | 2.0 | 11.0 | 5.1 | 0.7 | 8.3 |

| | Composition (%) by weight | | | | | Composition (%) by volume | | | | |
|---|---|---|---|---|---|---|---|---|---|---|
| Mix ID | Cement | Sand | Water | SBC | Foam | Cement | Sand | Water | SBC | Foam |
| AFS-200 | 8.0% | 75.0% | 14.0% | 2.0% | 0.9% | 3.6% | 42.7% | 20.1% | 1.3% | 32.3% |
| AFS-300 | 11.8% | 71.2% | 13.2% | 3.0% | 0.8% | 5.6% | 42.4% | 19.7% | 2.0% | 30.3% |
| AFS-400 | 15.6% | 67.3% | 12.5% | 3.9% | 0.8% | 7.5% | 40.4% | 18.9% | 2.7% | 30.5% |

TABLE 19

Compressive Strength Results for Compositions Of Table 18.

| | Composition (#/CY) | | | | | | | Compressive Strength (psi) | | | |
|---|---|---|---|---|---|---|---|---|---|---|---|
| | | | | | Foam | | | | | | |
| Mix ID | Cement | Sand | Water | SBC | (cf/CY) | UW (pcf) | Air (%) | 4-hour | 1-day | 7-day | 28-day |
| AFS-200 | 200 | 1870 | 350 | 50 | 9 | 88.0 | 32 | 11 | 31 | 51 | 76 |
| AFS-300 | 300 | 1805 | 334 | 75 | 8.2 | 92.0 | 30 | 41 | 80 | 111 | 174 |
| AFS-400 | 400 | 1730 | 321 | 100 | 8.3 | 91.6 | 30 | 38 | 92 | 159 | 220 |
| | | | | | | | Days | 0.167 | 1 | 7 | 28 |
| | | | | | | | Hours | 4 | 24 | 168 | 672 |

TABLE 20

Air Entrained Composition and Compressive Strength Result.
SBC Accelerated Cement - Sand - Air Entrained Mix

| | Composition (#/CY) | | | | | | Compressive Strength (psi) | | | |
|---|---|---|---|---|---|---|---|---|---|---|
| Mix ID | Cement | Sand | Water | SBC | UW (pcf) | Air (%) | 4-hour | 1-day | 7-day | 28-day |
| QS-200-Air | 200 | 2750 | 540 | 50 | 1061.0 | 20 | 10 | 40 | 60 | 83 |

Example 14

Figure 5:
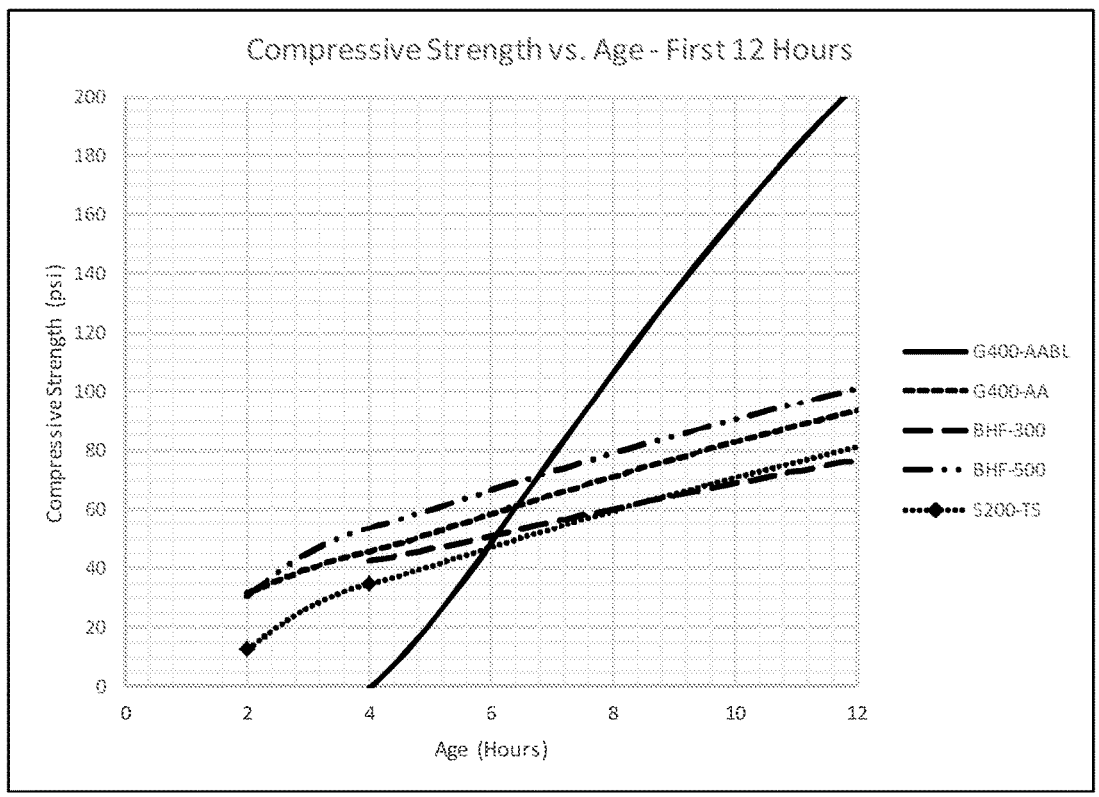
FIG. 5.
Figure 6:
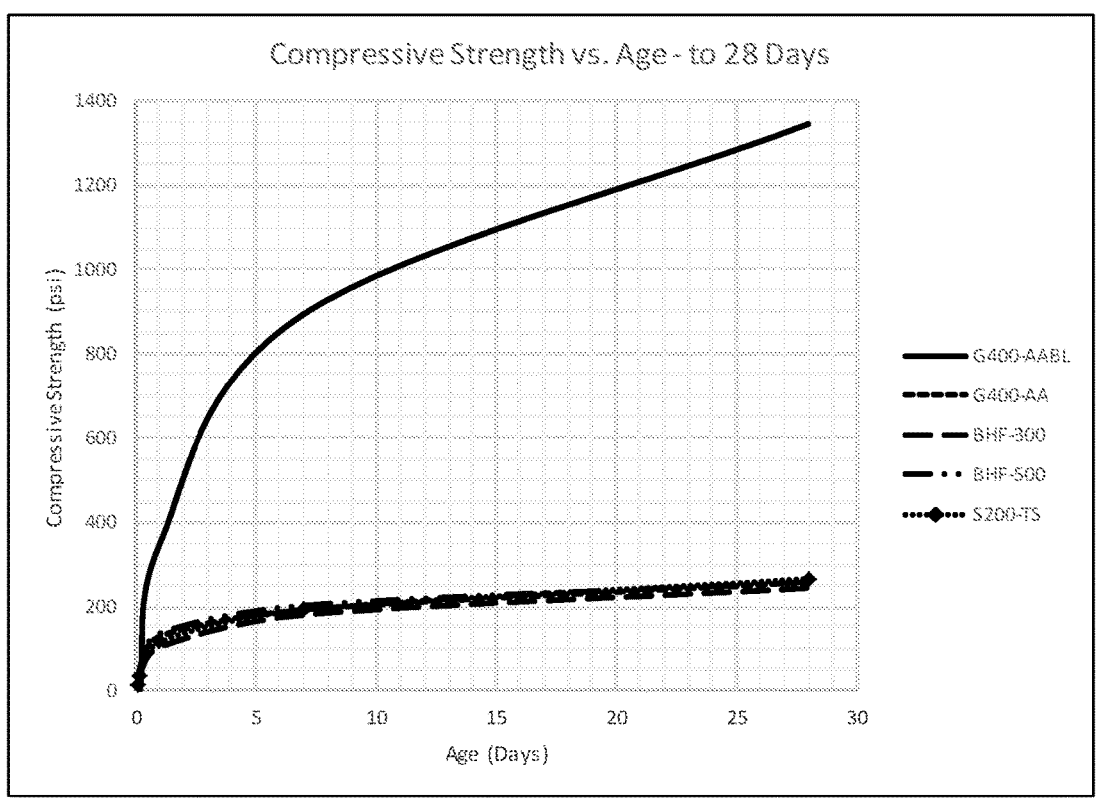
FIG. 6.

The compressive strength testing for compositions of previous Examples was graphed versus time (12 hours and 28 days) as disclosed in FIG. 5, which is a graph of the compressive strength (Y-axis (psi)) of G400-AABL, G400-AA, BHF-300, BHF-500, and S200-TS against the age in hours (X-axis (first 12 hours)) post mixing and FIG. 6, which is a graph of the compressive strength (Y-axis (psi)) of G400-AABL, G400-AA, BHF-300, BHF-500, and S200-TS against the age in days (X-axis (first 28 days)) post mixing. Notably, compositions using SBC as an accelerant (G400-AA), using BHF as a replacement for cement and/or sand (BHF-300, BHF-500), or using recycled trench spoils as a replacement for cement and/or sand (S200-TS) all achieve desirable characteristics compared to standard CLSM compositions (Baseline=G400-AA-BL).

Example 15

Figure 7:
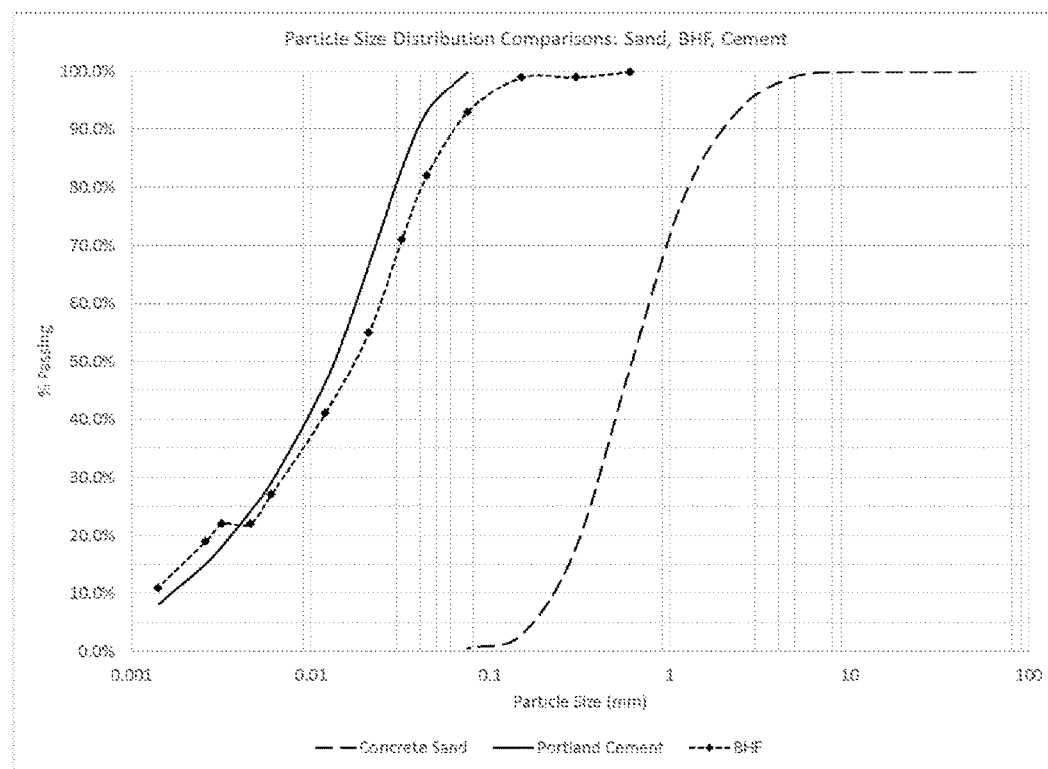
FIG. 7.

The particle size distributions of various ingredients from embodiments of the present disclosure are compared below by graphing particle size (X-axis (mm)) against percent passing (Y-axis (%)) for: concrete sand, BHF, and cement as disclosed in FIG. 7, which is a particle size distribution comparison for sand, BHF, and cement. Because the BHFs are similar in size, they act as a cement extender, resulting in additional fluidity in the mixes.

Figure 8:
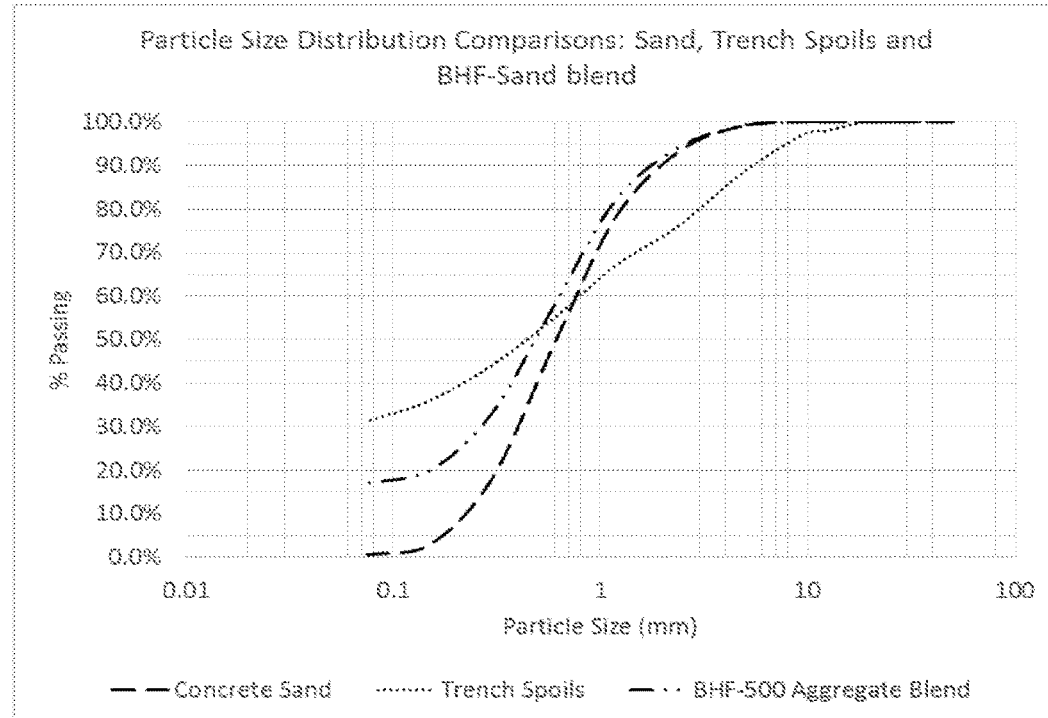
FIG. 8.

FIG. 8 is a graph that illustrates the particle size distribution of concrete sand, recycled trench spoils, and a BHF-cement blend used in the embodiments of the present disclosure as a function of particle sixe (X-axis (mm)) versus percent passing (Y-axis (%)). The additional amount of fines (smaller than the #200 sieve) in the BHFs blend tends to fill the voids occurring within the washed concrete sand, (e.g., "aggregate packing"), thus explaining the enhanced performance (same performance with half the cement and SBC). The recycled trench spoils has these additional fines from the trenching operations.

Example 16

Penetration testing of compositions using a combination of SBC and other commercial accelerants, including calcium chloride (CaCl) and non-chloride accelerator (NCA), show that a combination of accelerants are successful when fast setting times are desired. The penetration resistance was measured at 1 hour, 2 hours, 4 hours, 6 hours, and 8 hours after mixing. The $CaCl_2$) solution used for the below experiments consists of 32.5% dissolved solids ($CaCl_2$)) and water. The NCA used in the below experiments is manufactured by Euclid Chemical, 19215 Redwood Road, Cleveland, OH 44110, and sold as Accelguard 80. It is also a liquid composed of water and Calcium Nitrate ($CaNO_3$). Doses for the NCA follow the standard admixture dosage of fluid ounces per hundred weight of cementitious material (fl. oz./cwt).

Tables 23-24 discloses a modest improvement in setting (slight decrease in set time) using combinations of lower SBC doses and higher than typical doses of $CaCl_2$). By comparing the below results with results from compositions using only low doses of SBC, it can be seen that the addition of $CaCl_2$) decreases the set time. There appears to be little impact on the setting characteristics of the mix when using higher doses of SBC (10%-25%) in conjunction with the NCA, e.g., they are comparable to performance of the mixes utilizing only SBC at those doses.

TABLE 21

Compositions Comprising SBC and $CaCl_2$.

| | Composition (lb./CY) | | | | | Composition (%) | | | | |
|---|---|---|---|---|---|---|---|---|---|---|
| Mix No. | Cement | Sand | Water | SBC | CaCl | Cement | Sand | Water | SBC | CaCl |
| 1 | 400 | 2600 | 542 | 20 | 16 | 11.2% | 72.7% | 15.1% | 0.6% | 0.4% |
| 2 | 500 | 2525 | 542 | 25 | 20 | 13.8% | 69.9% | 15.0% | 0.7% | 0.6% |
| 3 | 400 | 2625 | 542 | 0 | 0 | 11.2% | 73.6% | 15.2% | 0.0% | 0.0% |
| 4 | 500 | 2550 | 542 | 0 | 0 | 13.9% | 71.0% | 15.1% | 0.0% | 0.0% |
| 7 | 400 | 2625 | 542 | 20 | 0 | 11.2% | 73.2% | 15.1% | 0.6% | 0.0% |
| 8 | 500 | 2525 | 542 | 25 | 0 | 13.9% | 70.3% | 15.1% | 0.7% | 0.0% |
| 9 | 400 | 2625 | 542 | 20 | 32 | 11.1% | 72.5% | 15.0% | 0.6% | 0.9% |
| 10 | 500 | 2525 | 542 | 25 | 32 | 13.8% | 69.7% | 15.0% | 0.7% | 0.9% |

TABLE 22

Compositions Comprising SBC and NCA.

| | Composition (lb./CY) | | | | NCA | Composition (%) | | | | NCA |
|---|---|---|---|---|---|---|---|---|---|---|
| Mix No. | Cement | Sand | Water | SBC | (fl. oz./cwt) | Cement | Sand | Water | SBC | (fl. oz./cwt) |
| 11 | 500 | 2525 | 542 | 20 | 32 | 13.8% | 69.8% | 15.0% | 0.6% | 32 |
| 12 | 500 | 2525 | 542 | 50 | 32 | 13.7% | 69.2% | 14.9% | 1.4% | 32 |
| 13 | 500 | 2525 | 542 | 125 | 32 | 13.4% | 67.8% | 14.6% | 3.4% | 32 |

TABLE 23

The Penetration Resistance Of Compositions From Table 21.

| | Penetration Resistance (tsf) | | | | |
|---|---|---|---|---|---|
| Mix No. | 1 hr | 2 hr | 4 hr | 6 hr | 8 hr |
| 1 | 0 | 0 | 0.5 | 0.75 | 1.5 |
| 2 | 0 | 0.5 | 1 | 1.5 | 3.5 |
| 3 | 0 | 0 | 0 | 0.75 | 2.5 |
| 4 | 0 | 0 | 0 | 1.5 | 4.25 |
| 7 | 0 | 0 | 0 | 0 | 0 |
| 8 | 0 | 0 | 0 | 0 | 0.25 |
| 9 | 0 | 0 | 0 | 0.25 | 0.25 |
| 10 | 0.25 | 0.5 | 0.75 | 1.75 | 4.5 |

TABLE 24

The Penetration Resistance Of Compositions From Table 22.

| | Penetration Resistance (tsf) | | | | |
|---|---|---|---|---|---|
| Mix No. | 1 hr | 2 hr | 4 hr | 6 hr | 8 hr |
| 11 | 0 | 0 | 0 | 0 | 0 |
| 12 | 0 | 0 | 1.5 | 2.5 | 3.5 |
| 13 | 0.25 | 36 | 137 | 161 | 230 |

What is claimed is:

1. A quick set flowable fill composition comprising:
   between 70% and 85% aggregate by weight of the composition;
   between 5% and 15% Portland cement by weight of the composition;
   between 1% and 5% sodium bicarbonate by weight of the composition;
   between 8% and 15% water by weight of the composition; and
   an air entraining agent;
   the composition having a compressive strength of between 10 psi and 75 psi after 2 hours, a compressive strength of between 40 psi and 140 psi after 4 hours, a compressive strength of between 200 psi and 500 psi after 28 days, and a spread of 8 inches or greater.

2. The composition of claim 1, wherein the aggregate comprises sand.

3. The composition of claim 2, wherein the sand comprises a fine aggregate.

4. The composition of claim 1, wherein the aggregate comprises a fine aggregate.

5. The composition of claim 1, wherein the composition further comprises recycled trench spoils.

6. The composition of claim 1, wherein the Portland cement is between 6% and 12% by weight of the composition.

7. The composition of claim 1 further comprising a water reducer between 9 and 18 fluid ounces per cubic yard of the composition.

8. The composition of claim 1 further comprising a polymer.

9. The composition of claim 1, wherein the air entraining agent is between 0.5 fluid oz/cwt to 2.0 fluid oz/cwt.

\* \* \* \* \*